US011270644B2

(12) United States Patent
Chang

(10) Patent No.: US 11,270,644 B2
(45) Date of Patent: Mar. 8, 2022

(54) PIXEL DRIVING CIRCUIT AND ELECTROLUMINESCENT DISPLAY DEVICE INCLUDING THE SAME

(71) Applicant: LG Display Co., Ltd., Seoul (KR)

(72) Inventor: Sung Wook Chang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/107,875

(22) Filed: Nov. 30, 2020

(65) Prior Publication Data

US 2021/0174743 A1 Jun. 10, 2021

(30) Foreign Application Priority Data

Dec. 10, 2019 (KR) ........................ 10-2019-0163746

(51) Int. Cl.

*G06F 3/038* (2013.01)
*G09G 5/00* (2006.01)
*G09G 3/3258* (2016.01)
*G09G 3/3291* (2016.01)
*G09G 3/3266* (2016.01)

(52) U.S. Cl.

CPC ......... *G09G 3/3258* (2013.01); *G09G 3/3266* (2013.01); *G09G 3/3291* (2013.01)

(58) Field of Classification Search

None

See application file for complete search history.

(56) References Cited

U.S. PATENT DOCUMENTS

2011/0227885 A1* 9/2011 Chung ................ G09G 3/3241 345/204

* cited by examiner

*Primary Examiner* — Kirk W Hermann

(74) *Attorney, Agent, or Firm* — Fenwick & West LLP

(57) ABSTRACT

A pixel driving circuit in each of the pixels includes: a first switching circuit that is turned on in response to the (n−2)th scan signal to provide a V1 voltage to a first node, provide a V3 voltage to a third node, and provide a V2 voltage to an anode of the light-emitting element; a second switching circuit turned on in response to the nth scan signal to electrically connect the first node to a second node, provide a V5 voltage to the third node, and provide a data voltage to a fourth node; and an emission control circuit turned on in response to the nth emission signal to electrically connect a second node to the anode and provide a reference voltage to the fourth node.

20 Claims, 13 Drawing Sheets

PIXEL DRIVING CIRCUIT AND ELECTROLUMINESCENT DISPLAY DEVICE INCLUDING THE SAME

CROSS-REFERENCE TO RELATED APPLICATION

This application claims priority to and the benefit of Republic of Korea Patent Application No. 10-2019-0163746, filed Dec. 10, 2019, the disclosure of which is incorporated herein by reference in its entirety.

BACKGROUND

1. Field

The present disclosure relates to a pixel driving circuit and an electroluminescent display device including the same, and more particularly, to an electroluminescent display device and a pixel driving circuit effective for variable frequency driving.

2. Discussion of Related Art

With the development of information technology, the market for display devices, which are connection media between information and users, is growing. Various forms of communication are actively performed between users beyond the transfer of text-based information. As the type of information changes, the performance of a display device for displaying information is also developing. Accordingly, the use of various types of display devices, such as organic light-emitting display devices, micro light-emitting diode (LED) display devices, liquid crystal display (LCD) devices, and quantum dot display devices, is increasing, and high-definition display devices have been actively studied to increase information clarity.

An electroluminescent display device includes a display panel including a plurality of subpixels, a driving circuit that supplies signals for driving the display panel, a power supply that supplies power to the display panel, and the like. The driving circuit includes a gate driving circuit that supplies gate signals to the display panel, a data driving circuit that supplies data signals to the display panel, and the like.

For example, the electroluminescent display device may display an image using a light-emitting element of a selected subpixel that emits light when the gate signals, the data signals, and the like are supplied to subpixels. The light-emitting element may be implemented based on an organic material or an inorganic material.

An electroluminescent display device displays an image based on light generated from light-emitting elements in subpixels and thus has various advantages but requires improvement in the accuracy of a pixel driving circuit that controls light emission of the subpixel in order to improve the quality of the image. For example, the accuracy of the pixel driving circuit may be improved by compensating for a threshold voltage of a driving transistor included in the pixel driving circuit.

SUMMARY

As the resolution and power consumption of an electroluminescent display device increase, a driving technique for reducing the power consumption of the electroluminescent display device has been developed. In order to reduce the power consumption, pixels may be driven at a low speed during a specific period by lowering a frame rate. For example, in the case of a mobile model, normal driving is performed at a frequency of 60 Hz, 120 Hz, or the like in an actual use mode, and low-speed driving is performed at a frequency such as 1 Hz or the like in a standby mode, thereby reducing the power consumption.

As described above, in order to enhance the accuracy of a pixel driving circuit, the pixel driving circuit, which compensates for a threshold voltage of a driving transistor, senses the threshold voltage of the driving transistor during a horizontal scanning period (1H time). Considering a substantial timing margin, the time for sensing the threshold voltage of the driving transistor is less than the horizontal scanning period. The horizontal scanning period is reduced as the resolution and driving frequency of the electroluminescent display device are increased. For example, a horizontal scanning period allocated to drive an electroluminescent display device, which has a quad high definition (QHD) resolution, at 120 Hz is 3 μs that is very short, and thus it is practically difficult to secure a sensing time of 2 μs. When the sensing time is not secured for more than one horizontal scanning period in high-speed driving (normal driving), image quality defects such as spots, afterimages, and crosstalk on a screen may occur.

Further, when transistors included in the pixel driving circuit are implemented as p-type polycrystalline transistors, a leakage current may be generated at a gate node of the driving transistor in low-speed driving. The generation of the leakage current makes it difficult for the light-emitting element to maintain the same brightness for one frame and causes a long data update period, and thus flicker may be seen.

Also, when a screen is switched from a black screen to a white screen, a phenomenon, in which the brightness of a first frame is lowered, occurs due to hysteresis of the driving transistor. Such a phenomenon in which the brightness of the first frame is lowered may degrade the quality of the electroluminescent display device because visibility is increased in the low-speed driving. The switching from the black screen to the white screen may mean a state in which the electroluminescent display device is powered on, and may also mean switching from a screen with a low brightness to a screen with a high brightness. In this case, the decrease in brightness of the first frame may appear in the form of a motion blur.

The inventors of the present disclosure recognized the above-described problems and invented an electroluminescent display device including a pixel driving circuit that allows a brightness non-uniformity phenomenon, which may occur when a display panel is driven at variable frequencies, to be reduced in an electroluminescent display device to which a driving method using frequency variation is applied.

An objective to be achieved according to an embodiment of the present disclosure is to provide an electroluminescent display device including a pixel driving circuit in which a compensation time for compensating for a threshold voltage of a driving transistor is sufficiently secured so that response speed is improved through high-speed driving and image quality is improved through the removal of spots, afterimages, and crosstalk on a screen.

Another objective to be achieved according to an embodiment of the present disclosure is to provide an electroluminescent display device including a pixel driving circuit in which a phenomenon in which brightness is lowered, which may occur in low-speed driving, is reduced.

Objectives of the present disclosure are not limited to the above-described objectives, and other objectives that are not described herein will be apparently understood by those skilled in the art from the following description.

One aspect of the present disclosure provides a pixel driving circuit including a driving transistor including a gate connected to a first node, a drain connected to a second node, and a source connected to a high potential voltage line providing a high potential voltage; a first capacitor connected to the first node and a third node; a second capacitor connected to the third node and a fourth node; a first switching circuit that is controlled by an (n−2)th scan signal and turned on in response to the (n−2)th scan signal to provide a V1 voltage to the first node, provide a V3 voltage to the third node, and provide a V2 voltage to the anode; a second switching circuit that is controlled by an nth scan signal and turned on in response to the nth scan signal to electrically connect the first node to the second node, provide a V5 voltage to the third node, and provide a data voltage to the fourth node; and an emission control circuit that is controlled by the nth emission signal and turned on in response to an nth emission signal to electrically connect the second node to the anode and provide a reference voltage to the fourth node. One aspect of the present disclosure provides an electroluminescent display device including a plurality of pixels included in an nth row thereof (here, n is a natural number), each of the pixels including a light-emitting element and a pixel driving circuit. The light-emitting element includes an anode, an organic compound layer, and a light-emitting layer. Accordingly, in the electroluminescent display device to which low-speed driving is applied, a brightness non-uniformity phenomenon that may be recognized at a low gradation may be reduced, and a period for sensing the threshold voltage of the driving transistor is sufficiently secured, thereby enhancing the accuracy of the pixel driving circuit.

Detailed description of other embodiments are described in the detailed descriptions and drawings.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
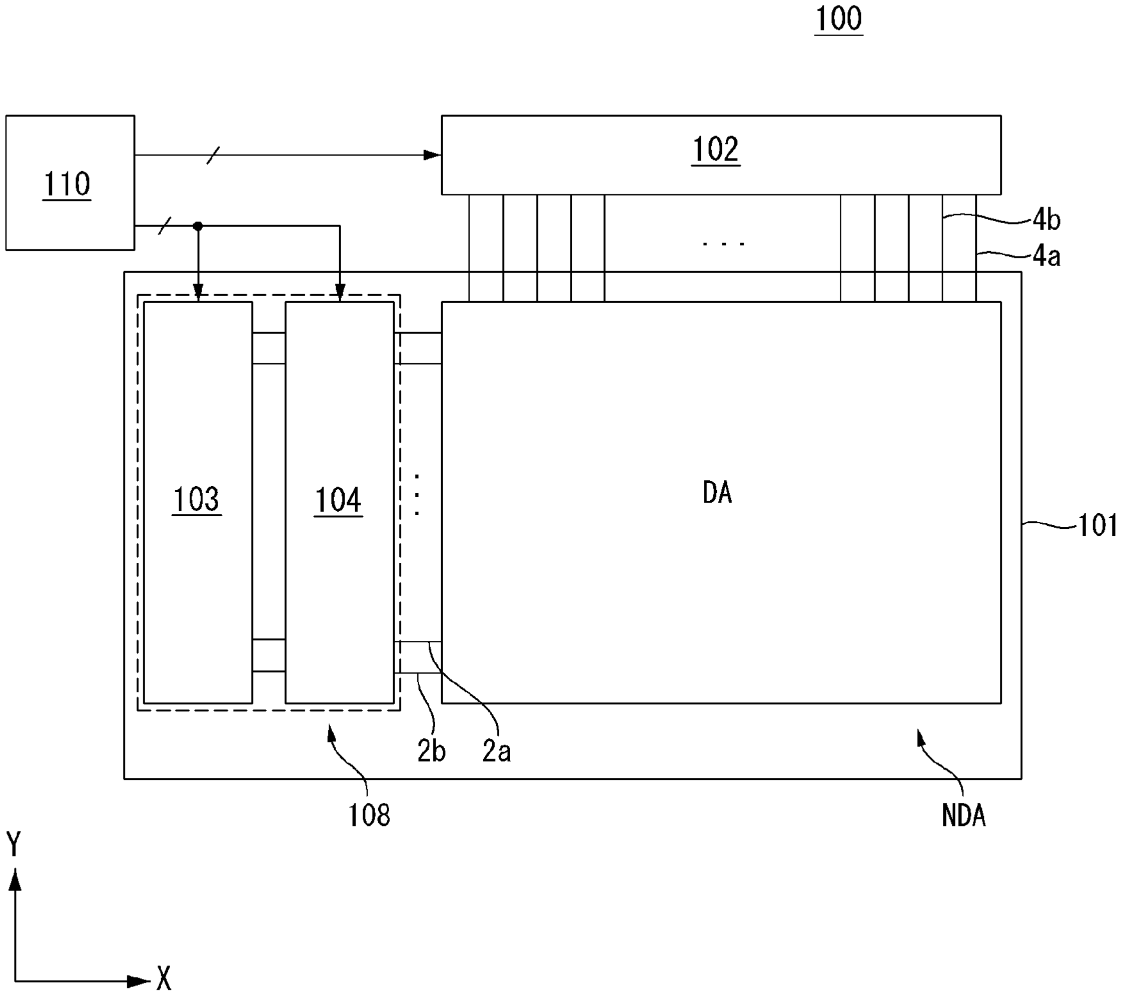
FIG. 1 is a block diagram illustrating an electroluminescent display device according to one embodiment of the present disclosure.

Advantages and features of the present disclosure, and implementation methods thereof will be apparent with reference to embodiments which will be described in detail with reference to the accompanying drawings. However, the present disclosure is not limited to the embodiments described below and may be embodied with a variety of different modifications. The embodiments are merely provided to allow those skilled in the art to completely understand the scope of the present disclosure, and the present disclosure is defined only by the scope of the claims.

The figures, dimensions, ratios, angles, numbers, and the like disclosed in the drawings for describing the embodiments of the present disclosure are merely illustrative and are not limited to matters shown in the present disclosure. Throughout the disclosure, like reference numerals refer to like elements. Further, in describing the present disclosure, detailed descriptions of well-known technologies will be omitted when it is determined that they may unnecessarily obscure the gist of the present disclosure. Terms such as “including,” “having,” and “composed of” used herein are intended to allow other elements to be added unless the terms are used with the term “only.” Any references to the singular may include the plural unless expressly stated otherwise.

Components are interpreted to include an ordinary error range even if not expressly stated.

For the description of a positional relationship, for example, when the positional relationship between two parts is described as “on,” “above,” “below,” “next to,” and the like, one or more parts may be interposed therebetween unless the term “immediately” or “directly” is used in the expression.

For the description of a temporal relationship, for example, when a temporal relationship is described as “after,” “subsequently to,” “next,” “before,” and the like, a non-consecutive case may be included unless the term “immediately” or “directly” is used in the expression.

The features of various embodiments of the present disclosure may be partially or entirely bonded to or combined with each other. The embodiments may be interoperated and performed in various ways technically and may be carried out independently of or in association with each other.

In the present disclosure, a pixel driving circuit and a gate driving circuit formed on a substrate of a display panel may be implemented as n-type or p-type transistors. For example, the transistors may be implemented as transistors having a metal-oxide-semiconductor field-effect transistor (MOSFET) structure. The transistors are three-electrode elements including a gate, a source, and a drain. The source is an electrode that supplies carriers to the transistor. In the transistor, the carriers move from the source to the drain. In the case of an n-type transistor, the carriers are electrons. Thus, the electrons move from the source to the drain, and a source voltage is lower than a drain voltage. In the n-type transistor, current flows from the drain to the source because the electrons move from the source to the drain. In the case of a p-type transistor, the carriers are holes. Thus, the source voltage is higher than the drain voltage so that the holes may move from the source to the drain. Current flows from the source to the drain because the holes of the p-type transistor move from the source to the drain. The source and drain of the transistor are not fixed, and the source and drain of the transistor may be changed according to an applied voltage.

Hereinafter, a gate-on voltage may be a voltage of a gate signal which may turn the transistor on. A gate-off voltage may be a voltage that may turn the transistor off. In a p-type transistor, the gate-off voltage may be a gate high voltage, and the gate-on voltage may be a gate low voltage. In an n-type transistor, the gate-off voltage may be a gate low voltage, and the gate-on voltage may be a gate high voltage.

Hereinafter, a pixel driving circuit and an electroluminescent display device including the same according to embodiments of the present disclosure will be described below with reference to the accompanying drawings.

FIG. 1 is a block diagram illustrating an electroluminescent display device according to one embodiment of the present disclosure.

Referring to FIG. 1, an electroluminescent display device 100 includes a display panel 101 and also includes a data driving circuit 102, a gate driving circuit 108, and a timing controller 110, which are for providing signals to the display panel 101.

The display panel 101 may be divided into a display area DA where images are displayed and a non-display area NDA where no image is displayed. In the display area DA, pixels for displaying an image are arranged. Each of the pixels may include a plurality of subpixels for implementing individual colors. The subpixels may be divided into red subpixels, green subpixels, and blue subpixels to implement the colors. In addition, each of the pixels may further include white subpixels. A color emitted by the subpixels included in one pixel may be configured such that when all the subpixels emit light, the color becomes white according to subtractive color mixing.

Each of the pixels is connected to data lines formed along a Y-axis (or a column direction) and is connected to gate lines formed along an X-axis (or a row direction). The pixels arranged along the X-axis are connected to the same gate line to receive the same gate signal.

Each of the pixels includes a light-emitting element and a pixel driving circuit that causes the light-emitting element to emit light with a predetermined brightness. The pixel driving circuit receives data signals, gate signals, and power signals to operate. The data signals are provided from the data driving circuit 102 to the pixels through data lines 4*a*, the gate signals are provided from the gate driving circuit 108 to the pixels through gate lines 2*a* and 2*b*, and the power signals are provided to the pixels through power lines 4*b*. The power lines 4*b* may include a high potential voltage line for supplying a high potential voltage to the pixel, a low potential voltage electrode for supplying a low potential voltage to the pixel, a reference voltage line for supplying a reference voltage to the pixel, a voltage line for supplying another predetermined voltage to the pixel, and the like. The high potential voltage is a voltage higher than the low potential voltage. The gate lines 2*a* and 2*b* may include multiple scan lines 2*a* through which scan signals are supplied and multiple emission signal lines 2*b* through which emission control signals are supplied.

The data driving circuit 102 generates a data voltage by converting data of an input image received from the timing controller 110 into a gamma compensation voltage under the control of the timing controller 110 and outputs the generated data voltage to the data lines 4*a*. The data driving circuit 102 may be formed on the display panel 101 in the form of an integrated circuit (IC) or may be formed on the display panel 101 in the form of a chip-on-film (COF).

The gate driving circuit 108 includes a scan driving circuit 103 and an emission driving circuit 104. The scan driving circuit 103 sequentially supplies the scan signals to the scan lines 2*a* under the control of the timing controller 110. An nth gate line is disposed in an nth row. For example, an nth scan signal applied to the nth gate line may be synchronized with an mth data voltage. In this case, n and m are natural numbers. The emission driving circuit 104 generates emission signals under the control of the timing controller 110. The emission driving circuit 104 sequentially supplies the emission signals to the emission signal lines 2*b*. The scan driving circuit 103 and the emission driving circuit 104 each include a plurality of stages for providing the signals to the gate lines.

The gate driving circuit 108 may be formed as an IC or may be formed as a gate in panel (GIP) embedded in the display panel 101. The gate driving circuit 108 may be disposed on one or each of left and right sides of the display panel 101. In addition, the gate driving circuit 108 may be disposed on an upper or lower side of the display panel 101 according to the shape of the display panel 101.

The timing controller 110 receives digital video data of the input image and a timing signal synchronized with the digital video data from a host system. The timing signal may include a data enable signal, a vertical synchronization signal, a horizontal synchronization signal, and a clock signal. The host system may be a television (TV) system, a set-top box, a navigation system, a digital video disk (DVD) player, a Blu-ray player, a personal computer, a home theater system, or a mobile information device.

The timing controller 110 generates a data timing control signal for controlling an operation timing of the data driving circuit 102, a gate timing control signal for controlling an operation timing of the gate driving circuit 108, and the like on the basis of the timing signal received from the host system. The gate timing control signal includes a start pulse, a shift clock, and the like. The start pulse may define a start timing at which a first output is generated for each shift register of the scan driving circuit 103 and the emission driving circuit 104. The shift register starts to be driven when the start pulse is input and generates a first output signal at a first clock timing. The shift clock controls an output shift timing of the shift register.

A period during which the gate signal and the data signal are applied once to all the pixels arranged in the display area DA in the column direction may be referred to as one frame period. The one frame period may be divided into a scan period in which data of the input image is supplied on each of the pixels through each of the gate lines connected to the pixels to write the data in each of the pixels and a light emission period in which the pixels are repeatedly turned on and off according to the emission signal after the scan period. The scan period may include an initialization period, a sampling period, and the like. The sampling period may include a programming period. During the scan period, nodes included in the pixel driving circuit are initialized, a threshold voltage of the driving transistor is compensated, and the data voltage is charged, and during the light emission period, a light emission operation is performed. The scan period only includes several horizontal scanning periods, and most of one frame period is the light emission period.

As the resolution of the display panel 101 increases, the number of pixels arranged in the column direction increases, and thus one horizontal scan period (1H time) is reduced. As a frequency increases in a display panel of the same resolution, one horizontal scan period (1H time) is reduced. The reduction of one horizontal scan period (1H time) causes the scan period to be reduced, and thus it is difficult to secure time to accurately compensate for the threshold voltage of the driving transistor. Accordingly, a pixel driving circuit in which the threshold voltage of the driving transistor may be accurately compensated for even when the resolution and/or frequency of the display panel increases will be described below.

Figure 2:
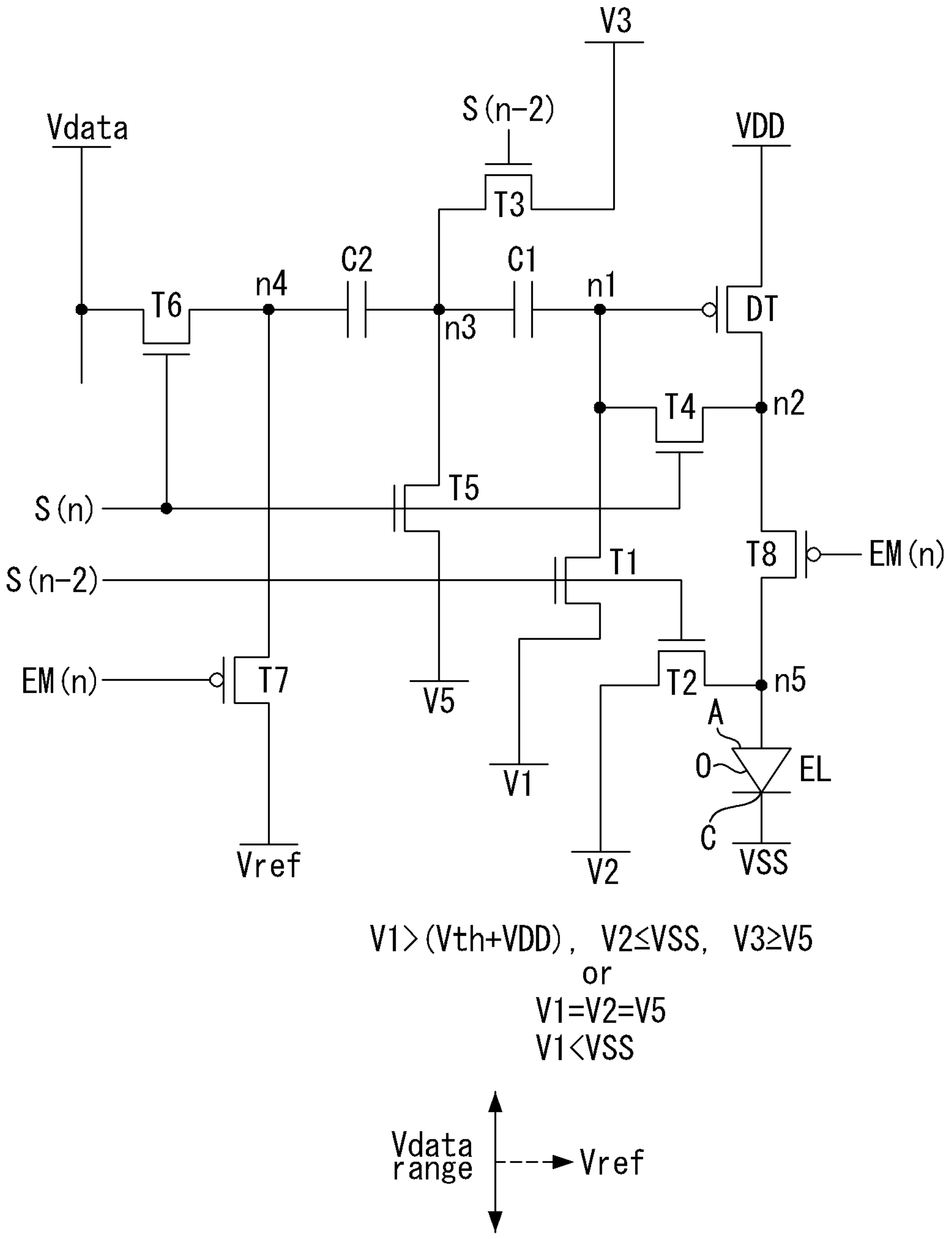
FIG. 2 illustrates a pixel driving circuit according to one embodiment of the present disclosure.

FIG. 2 illustrates a pixel driving circuit according to one embodiment of the present disclosure. The pixel driving circuit illustrated in FIG. 2 is for the description of a pixel arranged in the nth row.

Referring to FIG. 2, the pixel driving circuit for supplying a driving current to a light-emitting element EL includes a plurality of transistors and a plurality of capacitors. The pixel driving circuit according to one embodiment of the present disclosure is an internal compensation circuit in which a threshold voltage of a driving transistor DT may be compensated for through the pixel driving circuit.

Power supply voltages including a high potential voltage VDD, a low potential voltage VSS, a reference voltage Vref, and additional voltages V1, V2, V3, and V5, gate signals including an nth scan signal S(n), an (n−2)th scan signal S(n−2), and an nth emission signal EM(n), and a pixel driving signal having a data voltage Vdata are applied to the pixel driving circuit. The nth scan signal S(n) is a scan signal applied to the pixels arranged in the nth row, the (n−2)th scan signal S(n−2) is a scan signal applied to the pixels arranged in an (n−2)th row, and the nth emission signal EM(n) is an emission signal applied to the pixels arranged in the nth row.

Each of the scan signals S(n) and S(n−2) and the emission signal EM(n) has an on-level pulse or an off-level pulse at regular time intervals. The transistors according to one embodiment of the present disclosure are implemented as p-type metal-oxide-semiconductor (PMOS) transistors and n-type metal-oxide-semiconductor (NMOS) transistors. A turn-on voltage of the PMOS transistor is a gate low voltage (or an on-level pulse), and a turn-off voltage thereof is a gate high voltage (or an off-level pulse). A turn-on voltage of the NMOS transistor is a gate high voltage (or an on-level pulse), and a turn-off voltage thereof is a gate low voltage (or an off-level pulse).

The light-emitting element EL emits light by receiving a current that is adjusted by the driving transistor DT according to the data voltage Vdata, thereby representing brightness corresponding to grayscale data of an input image. The light-emitting element EL may include an anode A, a cathode C, and an organic compound layer O formed between the anode and the cathode. The organic compound layer may include a light-emitting layer, a hole injection layer, a hole transport layer, an electron transport layer, and an electron injection layer, but the present disclosure is not limited thereto. The anode of the light-emitting element EL may be connected to the driving transistor or an emission transistor for controlling light emission of the light-emitting element EL. In addition, the cathode of the light-emitting element EL is connected to the low potential voltage electrode to which the low potential voltage VSS is applied.

The driving transistor DT is a driving element that adjusts the current flowing to the light-emitting element EL according to a gate-source voltage Vgs, and is implemented as a PMOS transistor. The driving transistor DT includes a gate connected to a first node n1, a source connected to the high potential voltage line to which the high potential voltage VDD is provided, and a drain connected to a second node n2.

A first capacitor C1 includes two electrodes to form first capacitance. One electrode of the two electrodes is connected to the first node n1, and the other electrode thereof is connected to a third node n3. A second capacitor C2 includes two electrodes to form second capacitance. One electrode of the two electrodes is connected to the third node n3, and the other electrode thereof is connected to a fourth node n4.

A first switching circuit of the pixel driving circuit according to one embodiment of the present disclosure is turned on in response to the (n−2)th scan signal S(n−2) to initialize the anode of the light-emitting element EL and turn the driving transistor DT on for a predetermined period of time, thereby reducing a phenomenon in which the brightness of a first frame is lowered. The first switching circuit may include a first transistor T1, a second transistor T2, and a third transistor T3. The first switching circuit may be implemented as NMOS transistors, and the second transistor T2 of the first switching circuit may also be implemented as a PMOS transistor. When the second transistor T2 is implemented as a PMOS transistor, an additional scan driving circuit for supplying a scan signal to the second transistor T2 is required because the scan signal provided to the second transistor T2 must be different from a scan signal provided to the first transistor T1 and the third transistor T3.

The first transistor T1 is turned on in response to the (n−2)th scan signal S(n−2) to provide a V1 voltage V1 to the first node n1. The first transistor T1 is connected to the first node n1 and a V1 voltage line to which the V1 voltage V1 is provided.

The second transistor T2 is turned on in response to the (n−2)th scan signal S(n−2) to provide a V2 voltage V2 to a fifth node n5. The second transistor T2 is connected to a V2 voltage line and the fifth node n5.

The third transistor T3 is turned on in response to the (n−2)th scan signal S(n−2) to provide a V3 voltage V3 to the third node n3. The third transistor T3 is connected to the third node n3 and a V3 voltage line to which the V3 voltage V3 is provided.

A second switching circuit of the pixel driving circuit according to one embodiment of the present disclosure is turned on in response to the nth scan signal S(n) to program the data voltage Vdata and sample the threshold voltage of the driving transistor DT. In addition, by implementing the transistors included in the second switching circuit as NMOS transistors, the second switching circuit may also receive the scan signal from the scan driving circuit that provides the scan signal to the first switching circuit. The second switching circuit may include a fourth transistor T4, a fifth transistor T5, and a sixth transistor T6. The second switching circuit may be implemented as NMOS transistors, and the sixth transistor T6 of the second switching circuit may also be implemented as a PMOS transistor. When the sixth transistor T6 is implemented as a PMOS transistor, an additional scan driving circuit for supplying a scan signal to the sixth transistor T6 is required because the scan signal provided to the sixth transistor T6 must be different from a scan signal provided to the fourth transistor T4 and the fifth transistor T5.

The fourth transistor T4 is turned on in response to the nth scan signal S(n) to connect the gate and the drain of the driving transistor DT. The fourth transistor T4 is connected to the first node n1 and the second node n2.

The fifth transistor T5 is turned on in response to the nth scan signal S(n) to provide a V5 voltage V5 to the third node n3. The fifth transistor T5 is connected to the third node n3 and a V5 voltage line to which the V5 voltage V5 is provided.

The sixth transistor T6 is turned on in response to the nth scan signal S(n) to provide the data voltage Vdata to the fourth node n4. The sixth transistor T6 is connected to the fourth node n4 and a data voltage line to which the data voltage Vdata is provided.

The nth scan signal S(n) and the (n−2)th scan signal S(n−2) provided to the first switching circuit and the second switching circuit are signals output from different stages included in the same scan driving circuit.

A leakage current, which may be generated at the gate of the driving transistor DT, may be reduced by implementing the first transistor T1, the third transistor T3, the fourth transistor T4, and the fifth transistor T5, which are connected to the first capacitor C1 and the gate of the driving transistor DT, among the first switching circuit and the second switching circuit as NMOS transistors, so that the light-emitting element EL may maintain the same brightness for one frame. For example, an active channel of the NMOS transistor may be an oxide semiconductor mainly containing at least one of Indium, Gallium, and Zinc. In addition, by implementing the second transistor T2 and the sixth transistor T6 as NMOS transistors, no additional scan driving circuit is required, and thus the configuration of the gate driving circuit may be simplified and a non-display area NDA of an electroluminescent display panel may be reduced.

An emission control circuit of the pixel driving circuit according to one embodiment of the present disclosure is turned on in response to the nth emission signal EM(n) to provide the reference voltage Vref to the fourth node n4 and provide a driving current to the light-emitting element EL. The emission control circuit is implemented as PMOS transistors and includes a seventh transistor T7 and an eighth transistor T8.

The seventh transistor T7 is turned on in response to the nth emission signal EM(n) to provide the reference voltage Vref to the fourth node n4. The seventh transistor T7 is connected to the fourth node n4 and a reference voltage line to which the reference voltage Vref is provided.

The eighth transistor T8 is turned on in response to the nth emission signal EM(n) to provide the driving current provided from the driving transistor DT to the anode of the light-emitting element EL. The eighth transistor T8 is connected to the second node n2 and the fifth node n5. The eighth transistor T8 may be referred to as an emission transistor.

FIGS. 3A, 4A, 5A, and 6A are diagrams each illustrating a driving process of the pixel driving circuit, and FIGS. 3B, 4B, 5B, and 6B are waveform diagrams each illustrating signals input or output in the corresponding driving process. A driving period of the pixel driving circuit may be divided into an initialization period ①, a sampling period ②, a holding period ③, and a light emission period ④.

Figure 3A:
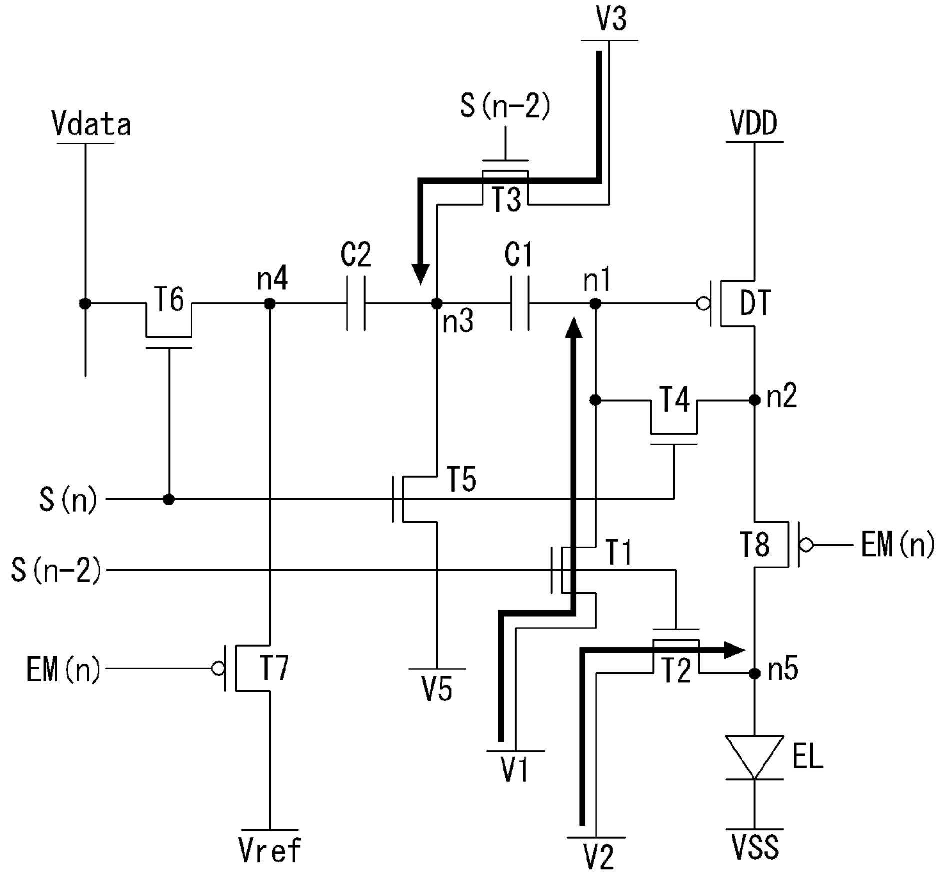
FIGS. 3A, 4A, 5A, and 6A are diagrams each illustrating a driving process of the pixel driving circuit.
Figure 3B:
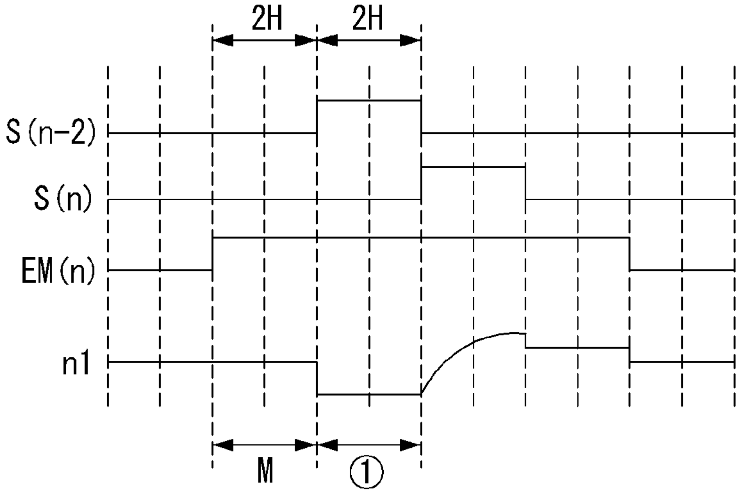
FIG. 3B, FIG. 4B, FIG. 5B, and FIG. 6B are waveform diagrams each illustrating signals input or output in the corresponding driving process.

FIG. 3A is a diagram illustrating the initialization period ① among the driving process of the pixel driving circuit, and FIG. 3B is a waveform diagram illustrating signals input or output in the initialization period ①. The initialization period ① has two horizontal scanning periods (2H time) and is controlled by the (n−2)th scan signal S(n−2). The (n−2)th scan signal S(n−2) has an on-level pulse during the initialization period ① and an off-level pulse during periods other than the initialization period ①. While the (n−2)th scan signal S(n−2) has the on-level pulse, the nth scan signal S(n) and the nth emission signal EM(n) have the off-level pulse. In this case, in order to prevent the nth emission signal EM(n) and the (n−2)th scan signal S(n−2) from being mixed and input into the pixel driving circuit and causing the light-emitting element EL to emit light, the nth emission signal EM(n) is switched to the state of the off-level pulse with a margin period M before the initialization period ①. For example, the margin period M may be two horizontal scanning periods (2H time), but the present disclosure is not limited thereto, and the margin period M may be greater than or equal to one horizontal scan period (1H time).

During the initialization period ①, the first switching circuit (T1, T2, and T3) and the driving transistor DT are turned on, and the second switching circuit (T4, T5, and T6) and the emission control circuit (T7 and T8) are turned off.

During the initialization period ①, the first transistor T1 is turned on to provide the V1 voltage V1 to the gate of the driving transistor DT to turn the driving transistor DT on. The source of the driving transistor DT is connected to the line to which the high potential voltage VDD is applied so that the high potential voltage VDD is always maintained at the source. Accordingly, a stress voltage applied to the driving transistor DT is determined according to the V1 voltage V1 applied to the gate of the driving transistor DT. During the initialization period ①, the state of the V1 voltage V1 is maintained at the first node n1 to turn the driving transistor DT on and apply constant stress to the driving transistor DT. Since the stress is applied to the driving transistor DT for a predetermined period of time due to the V1 voltage V1 provided to the first node n1 through the first transistor T1, a phenomenon in which the brightness of a first frame is lowered, which occurs due to the hysteresis of the driving transistor DT, may be reduced. In this case, the V1 voltage V1 is a fixed voltage that initializes the gate of the driving transistor DT while turning the driving transistor DT on. The lower the V1 voltage V1, the greater the range of a threshold voltage Vth of the driving transistor DT that can be sensed. During the initialization period ①, the gate-source voltage Vgs of the driving transistor DT is a difference between the V1 voltage V1 and the high potential voltage VDD. In the sampling period ②, the gate-source voltage Vgs of the driving transistor DT rises from the difference between the V1 voltage V1 and the high potential voltage VDD until the threshold voltage Vth of the driving transistor DT. When the difference between the V1 voltage V1 and the high potential voltage VDD is higher than the threshold voltage Vth of the driving transistor DT, the threshold voltage Vth of the driving transistor DT may not be sensed. Thus, the V1 voltage V1 is a voltage higher than the sum of the threshold voltage Vth and the high potential voltage VDD of the driving transistor DT. In other words, although it is preferable for the V1 voltage V1 to have a low voltage to turn the driving transistor DT on so that the driving transistor DT is put in a stressed state for a predetermined period of time, in order to sense the threshold voltage Vth of the driving transistor DT, the V1 voltage V1 may be set to a voltage higher than the sum of the threshold voltage Vth and the high potential voltage VDD of the driving transistor DT. The detailed description of the sampling period ② will be given below.

In addition, the time during which the stress is applied to the driving transistor DT may be changed by adjusting the initialization period ①. In order to improve the hysteresis of the driving transistor DT, the driving transistor DT should be maintained in a turned-on state for a predetermined period of time, and the first switching circuit according to one embodiment of the present disclosure may adjust the time during which the driving transistor DT is turned on using the (n−2)th scan signal S(n−2) to reduce the influence due to the hysteresis of the driving transistor DT. The pixel driving circuit according to one embodiment of the present disclosure may secure two horizontal scanning periods (2H time)

or more as the sampling period ② so that it is possible to adjust the time during which the stress is applied to the driving transistor DT without separating the scan driving circuit controlling the initialization period ① from the scan driving circuit controlling the sampling period ②. In this case, the initialization period ① is set so as not to overlap the sampling period ②.

As described above, the phenomenon in which the brightness of the first frame is lowered is noticeable during low-speed driving. In order to implement the low-speed driving to reduce power consumption, a brightness non-uniformity phenomenon due to the brightness degradation must be solved. Accordingly, by applying stress to the driving transistor DT for a predetermined period of time during the initialization period ① to reduce a phenomenon in which the brightness is lowered, a display panel may be implemented which may be driven at a low speed.

During the initialization period ①, the second transistor T2 is turned on to provide the V2 voltage V2 to the anode of the light-emitting element EL so that the anode of the light-emitting element EL is discharged to have the V2 voltage V2. Since the V2 voltage V2 is a voltage lower than or equal to the low potential voltage VSS, the light-emitting element EL does not emit light. In the high-speed driving, a period for sensing the threshold voltage Vth of the driving transistor DT periodically occurs, and during this period, the light-emitting element EL does not emit light. In other words, every frame is displayed by allowing the compensation circuit to operate in the high-speed driving. In this case, each frame may be referred to as a refresh frame. For example, when driving at 60 Hz, the refresh frame is generated 60 times for one second. On the other hand, in the low-speed driving, the operation of sensing the threshold voltage Vth of the driving transistor DT is not performed, but the operation of causing the light-emitting element EL to emit light is performed. In this case, each frame may be referred to as a skip frame. When the light-emitting element EL is periodically turned off in the refresh frame and continuously emits light in the skip frame, it may be recognized as flicker, and thus the emission transistor may be used to reduce the likelihood of the light-emitting element EL from periodically emitting light even in the skip frame. For example, when driving at a low speed of 1 Hz on a 60 Hz driving display panel, the refresh frame appears in the first frame for one second, and the skip frame appears in the remaining 59 frames. However, when only the emission transistor is turned off, flicker is generated because a start voltage of the anode of the light-emitting element EL is different in the refresh frame and the skip frame. Accordingly, by providing the V2 voltage V2 to the fifth node n5 through the second transistor T2 to adjust the voltage provided to the anode of the light-emitting element EL, flicker, which may be recognized in a low gradation, may be reduced.

In addition, during the initialization period ①, the third transistor T3 is turned on to provide the V3 voltage V3 to the third node n3 so that one electrode of the first capacitor C1 is initialized to have the V3 voltage V3. The V3 voltage V3 is a fixed voltage higher than or equal to the V5 voltage V5. The voltage provided to the gate of the driving transistor DT is decreased at the time of starting sensing by making the V3 voltage V3 higher than or equal to the V5 voltage V5, thereby increasing the range in which the threshold voltage Vth of the driving transistor DT can be sensed.

Figure 4A:
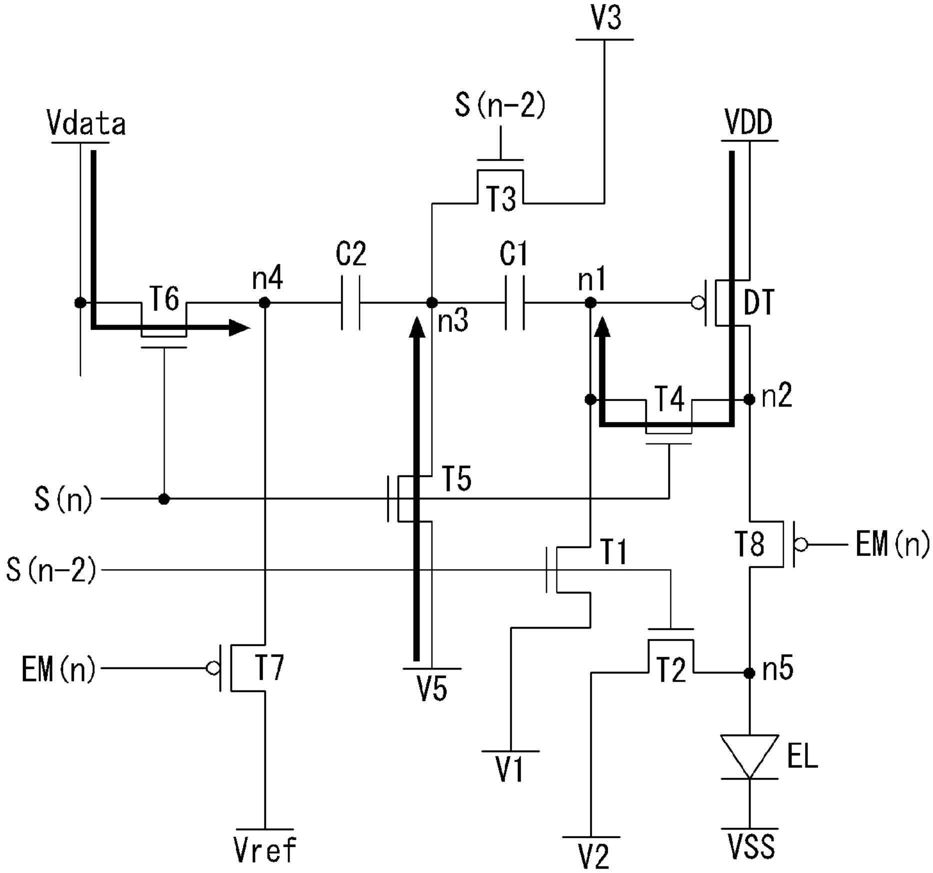
Figure 4B:
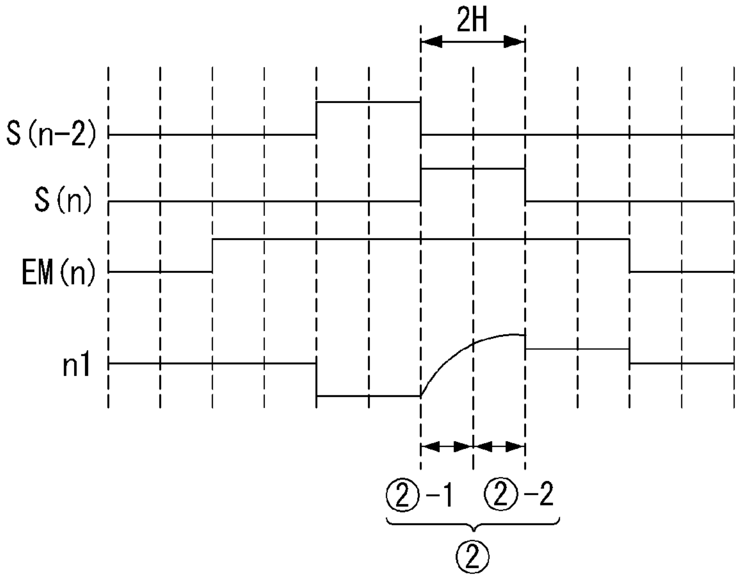

(FIG. 4A is a diagram illustrating the sampling period ② among the driving process of the pixel driving circuit, and FIG. 4B is a waveform diagram illustrating signals input or output in the sampling period. The sampling period ② has two horizontal scanning periods (2H time) and is controlled by the nth scan signal S(n). The nth scan signal S(n) has an on-level pulse during the sampling period ② and an off-level pulse during periods other than the sampling period ②.

During the sampling period ②, the second switching circuit (T4, T5, and T6) and the driving transistor DT are turned on, and the first switching circuit (T1, T2, and T3) and the emission control circuit (T7 and T8) are turned off. In addition, the sampling period ② may include a first sampling period ②-1 and a second sampling period ②-2. The first sampling period ②-1 and the second sampling period ②-2 may each have one horizontal scan period (1H time).

During the first sampling period ②-1, the fourth transistor T4 is turned on to connect the gate and the drain of the driving transistor DT such that diode connection of the driving transistor DT is achieved, thereby turning the driving transistor DT on. The voltage of the first node n1, which is a gate node of the turned-on driving transistor DT, rises until the gate-source voltage Vgs of the driving transistor DT reaches the threshold voltage Vth of the driving transistor DT.

During the first sampling period ②-1, the fifth transistor T5 is turned on to provide the V5 voltage V5 to the third node n3. The V5 voltage V5 is a voltage lower than or equal to the V3 voltage V3 and is a fixed voltage that fixes the voltage of the third node n3 during the sampling period ②.

In addition, during the first sampling period ②-1, the sixth transistor T6 is turned on to provide the data voltage Vdata to the fourth node n4. Since the fourth node n4 is connected to one electrode of the second capacitor C2, the second capacitor C2 stores the data voltage Vdata.

During the second sampling period ②-2 following the first sampling period ②-1, the voltage of the first node n1 continues to rise to be the sum of the high potential voltage VDD and the threshold voltage Vth of the driving transistor DT, and the first capacitor C1 senses the threshold voltage Vth of the driving transistor DT. In this case, the voltage that is the sum of the high potential voltage VDD and the threshold voltage Vth is stored in one electrode of the first capacitor C1, and the V5 voltage V5 is stored in the other electrode of the first capacitor C1. The pixel driving circuit according to one embodiment of the present disclosure is implemented to include the second sampling period ②-2 so that the time for sensing the threshold voltage Vth of the driving transistor DT is sufficiently secured to enhance the reliability of the pixel driving circuit.

The third node n3 is a node shared by the first capacitor C1 and the second capacitor C2. During the sampling period ②, the voltage of the third node n3 is fixed to the V5 voltage V5 so that the sensing of the threshold voltage Vth of the driving transistor DT may be performed independently from the input of the data voltage Vdata. In this case, the first capacitor C1 and the second capacitor C2 store the threshold voltage Vth of the driving transistor DT and the data voltage Vdata, respectively.

Since the scan signals S(n−2) and S(n) controlling the initialization period ① and the sampling period ② are provided from the same scan driving circuit, the initialization period ① may have the same time as the sampling period ②. However, when each of the time during which the stress is applied to the driving transistor DT and the time during which the threshold voltage Vth of the driving transistor DT is sensed is intended to set by being adjusted, the gate driving circuit may be implemented such that the scan signal controlling the initialization period ① and the scan signal controlling the sampling period ② are provided in different scan driving circuits.

Figure 5A:
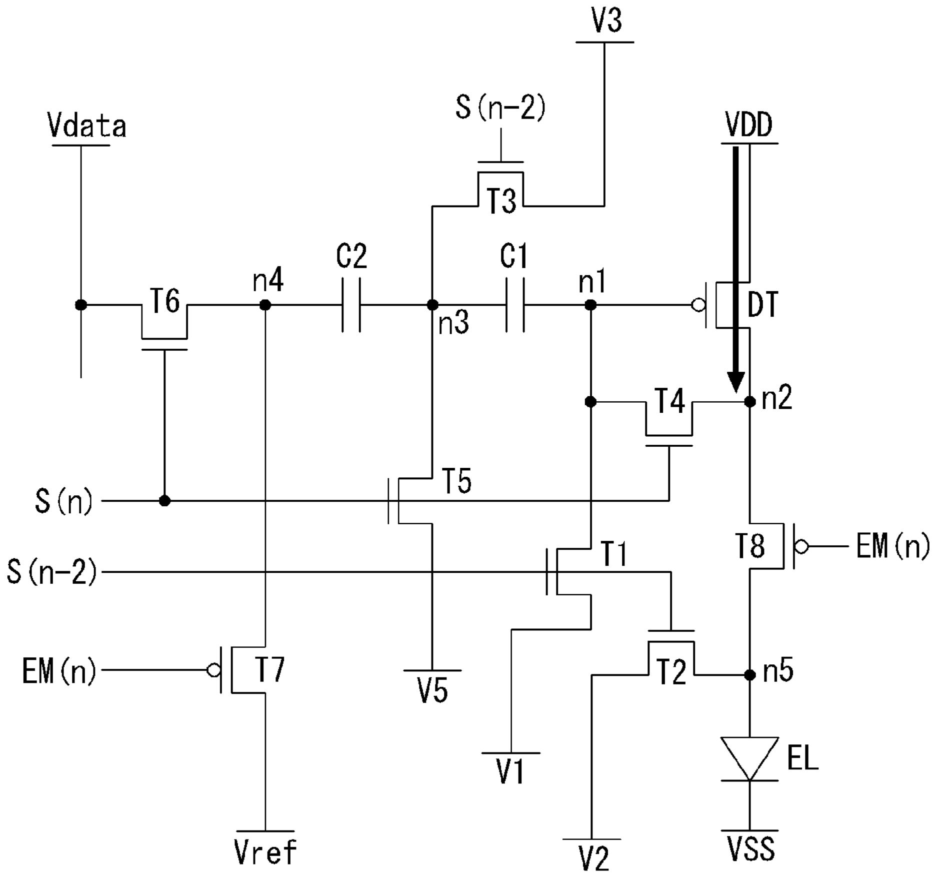
Figure 5B:
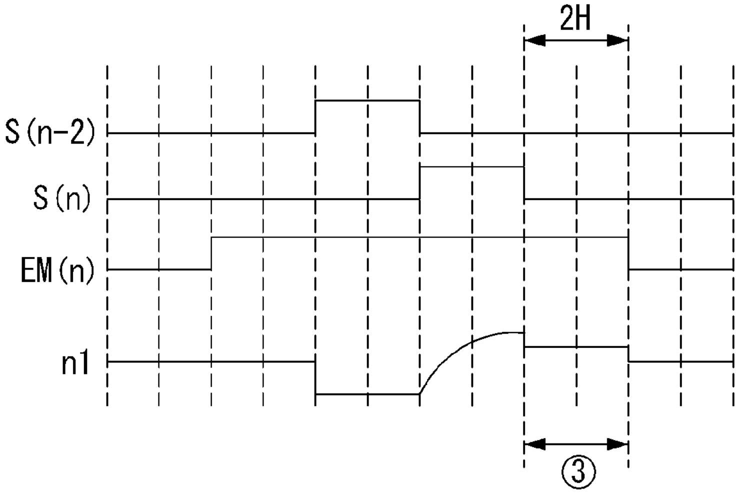

FIG. 5A is a diagram illustrating the holding period ③ among the driving process of the pixel driving circuit, and FIG. 5B is a waveform diagram illustrating signals input or output in the holding period. The holding period ③ may be controlled by the nth emission signal EM(n). During the holding period ③, the (n−2)th scan signal S(n−2), the nth scan signal S(n), and the nth emission signal EM(n) have an off-level pulse, and the holding period ③ is maintained until the nth emission signal EM(n) is switched to an on-level pulse. The emission signal EM(n) maintains the off-level pulse for at least four horizontal scanning periods overlapping the (n−2)th scan signal S(n−2) and the nth scan signal S(n). Like the above-described margin period M, the holding period ③ prevents the nth emission signal EM(n) and the nth scan signal S(n), which have the on-level pulse, from being mixed with each other. The holding period ③ is illustrated in (b) in FIG. 5 as having two horizontal scanning periods (2H time), but the present disclosure is not limited thereto, and the holding period ③ may be greater than or equal to one horizontal scan period (1H time).

Figure 6A:
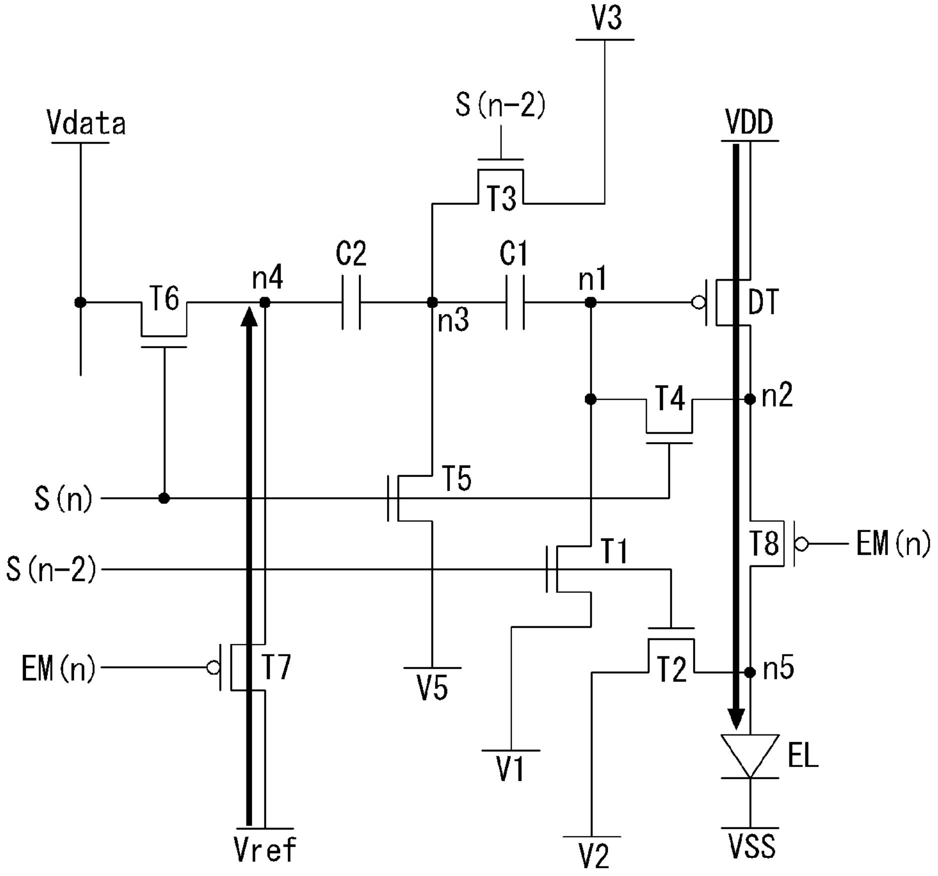
Figure 6B:
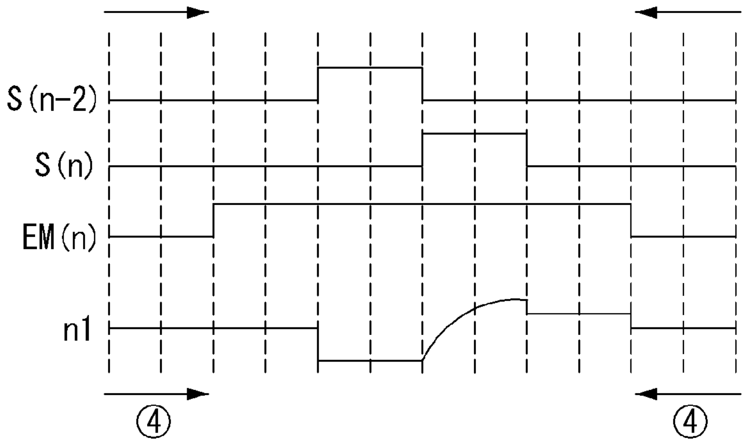

FIG. 6A is a diagram illustrating the light emission period ④ among the driving process of the pixel driving circuit, and FIG. 6B is a waveform diagram illustrating signals input or output in the light emission period. The light emission period ④ occupies most of one frame period and is controlled by the nth emission signal EM(n). The nth emission signal EM(n) has an on-level pulse during the light emission period ④ and an off-level pulse during periods other than the light emission period ④. During the light emission period ④, both the (n−2)th scan signal S(n−2) and the nth scan signal S(n) have an off-level pulse.

During the light emission period ④, the first switching circuit (T1, T2, and T3) and the second switching circuit (T4, T5, and T6) are turned off, and the emission control circuit (T7 and T8) and the driving transistor DT are turned on.

During the light emission period ④, the seventh transistor T7 is turned on to provide the reference voltage Vref to the fourth node n4. As the voltage of the fourth node n4 changes from the data voltage Vdata to the reference voltage Vref, the voltage of the third node n3 becomes the voltage obtained by subtracting the data voltage Vdata from the sum of the V5 voltage V5 and the reference voltage Vref due to the coupling phenomenon of the second capacitor C2 connected to the fourth node n4. In addition, the voltage change in the third node n3, which is caused by the coupling phenomenon of the first capacitor C1, changes the voltage of the first node n1. The voltage of the first node n1 is obtained by adding the difference between the reference voltage Vref and the data voltage Vdata to the sum of the threshold voltage Vth of the driving transistor DT and the high potential voltage VDD. The reference voltage Vref may be determined as a fixed voltage within a range of an intermediate value in the range of the data voltage Vdata. When the reference voltage Vref becomes the reference, a high gradation may be expressed with the data voltage Vdata higher than the reference voltage Vref and a low gradation may be expressed with the data voltage Vdata lower than the reference voltage Vref.

In addition, during the light emission period ④, the driving transistor DT is turned on by the voltage of the first node n1 to provide the driving current to the anode of the light-emitting element EL. In this case, a driving current $I_{oled}$ is expressed as Equation 1 below.

$$I_{oled}=K(Vgs-Vth)^2=K(Vref-Vdata)^2 \quad \text{[Equation 1]}$$

where K is a constant reflecting the characteristics of the driving transistor DT, such as, a length of a channel, a width of the channel, a parasitic capacitance between the gate and the active channel, and mobility.

Referring to Equation 1, the threshold voltage Vth of the driving transistor DT is removed from the equation of the driving current $I_{oled}$, and thus the driving current $I_{oled}$ is not dependent on the threshold voltage Vth of the driving transistor DT and also is not affected by the change in the threshold voltage Vth. In addition, the driving current $I_{oled}$ is also not affected by the high potential voltage VDD, and thus the variability of the driving current due to the voltage drop of the high potential voltage line is also lowered.

The pixel driving circuit according to one embodiment of the present disclosure may reduce the leakage current at the gate node of the driving transistor DT, which may be generated during high-speed driving (normal driving), and reduce brightness degradation that may occur during low-speed driving so that an electroluminescent display device to which the pixel driving circuit according to one embodiment of the present disclosure is applied may reduce power consumption while enhancing image quality.

Figure 7A:
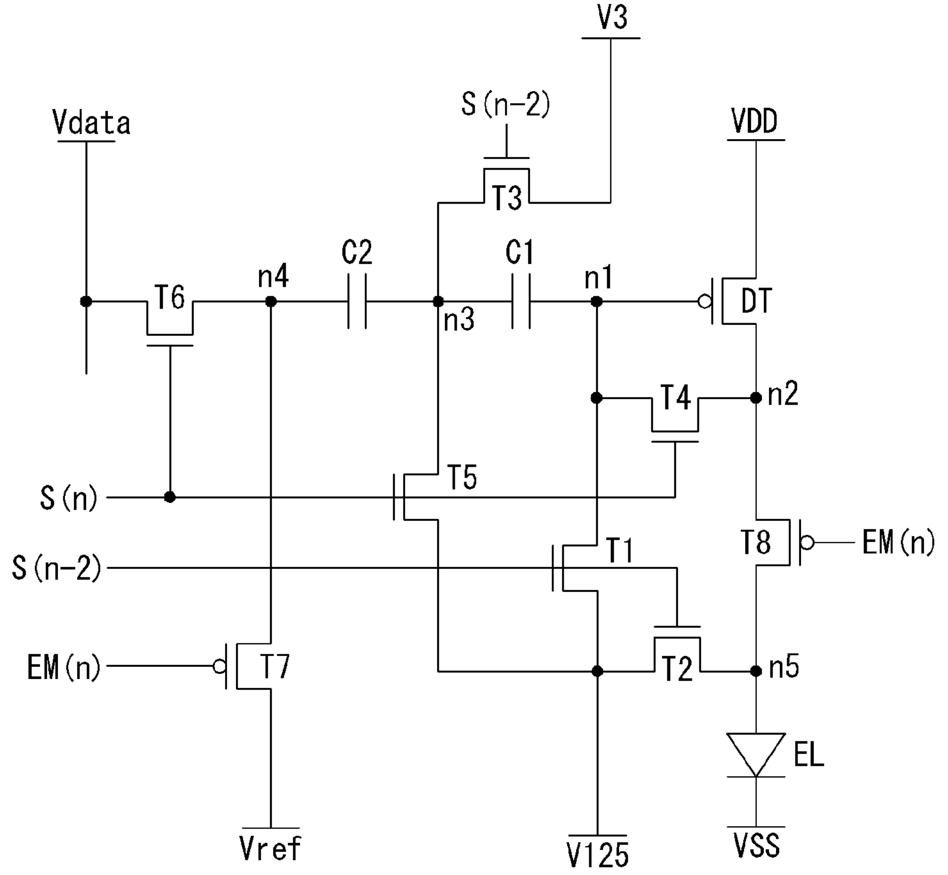
FIGS. 7A, 7B, and 7C illustrate circuits modified from the pixel driving circuit according to one embodiment of the present disclosure.
Figure 7B:
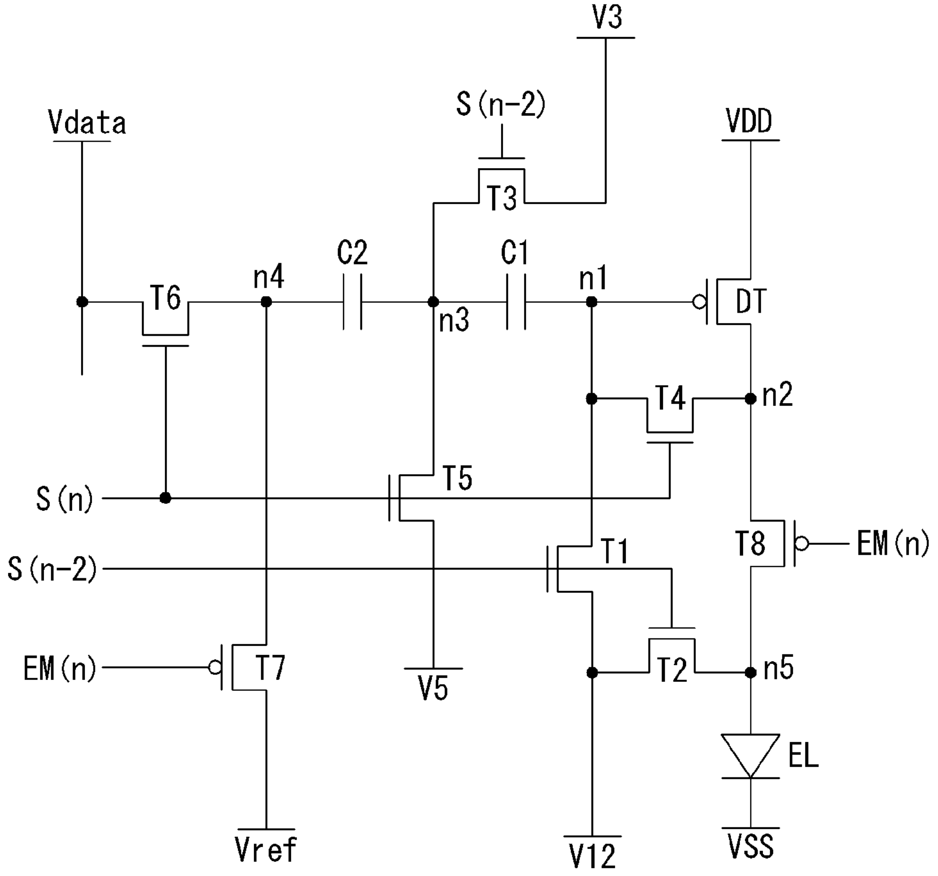
Figure 7C:
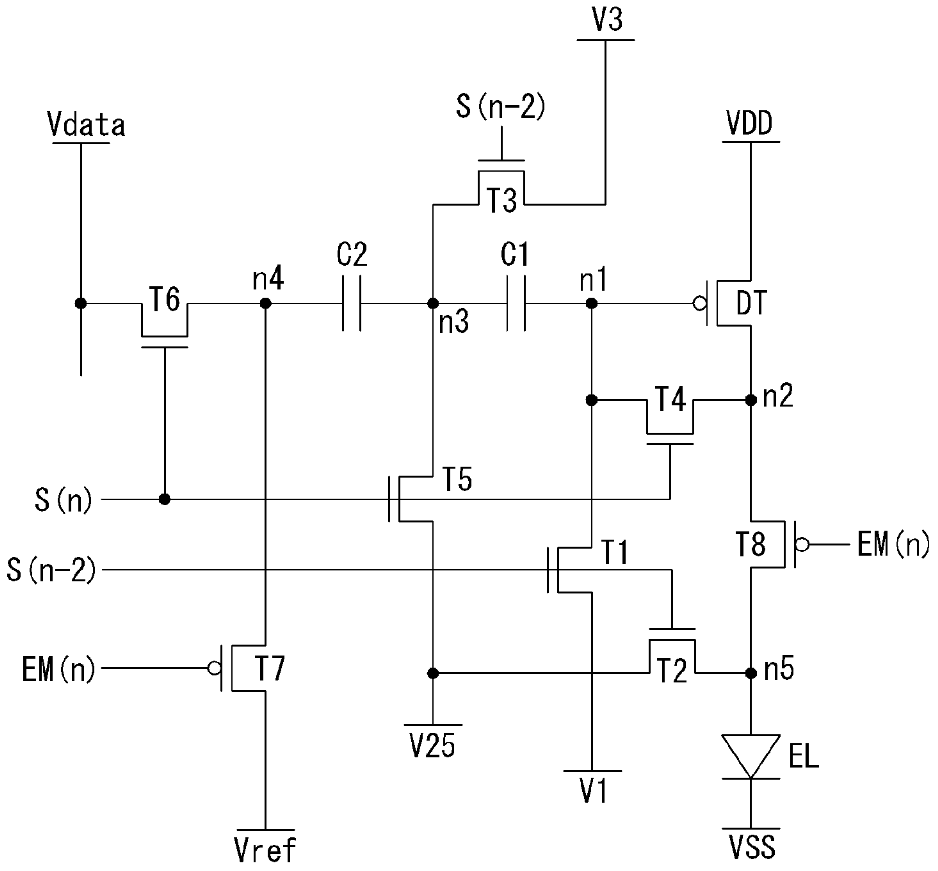

FIGS. 7A, 7B, and 7C illustrate circuits modified from the pixel driving circuit according to one embodiment of the present disclosure, and thus, duplicated components from the pixel driving circuit illustrated with reference to FIG. 2 may be briefly described, or the description thereof may be omitted.

In FIG. 7A, the first transistor T1, the second transistor T2, and the fifth transistor T5 of the pixel driving circuit according to one embodiment of the present disclosure shown in FIG. 2 are all connected to a V125 voltage line to which a V125 voltage V125 is provided, and the connection relationship between the remaining components is substantially the same as that in FIG. 2. In this case, the voltage provided to the first node n1 and the voltage provided to the fifth node n5 in the initialization period ①, and the voltage provided to the third node n3 in the sampling period ② are the same as the V125 voltage V125. The V125 voltage V125 may be a negative voltage that is lower than the high potential voltage VDD, the low potential voltage VSS, and the reference voltage Vref and higher than the sum of the high potential voltage VDD and the threshold voltage Vth of the driving transistor DT and may be referred to as an initialization voltage.

In FIG. 7B, the first transistor T1 and the second transistor T2 of the pixel driving circuit according to one embodiment of the present disclosure shown in FIG. 2 are connected to a V12 voltage line to which a V12 voltage V12 is provided, the fifth transistor T5 is connected to the V5 voltage line, and the connection relationship between the remaining components is substantially the same as that in FIG. 2. In this case, the voltage provided to the first node n1 and the voltage provided to the fifth node n5 in the initialization period ① are the same as the V12 voltage V12. The V5 voltage V5 may be a voltage lower than or equal to the V3 voltage V3 or a negative voltage that is lower than the high potential voltage VDD, the low potential voltage VSS, and the reference voltage Vref, and may be referred to as an initialization voltage. In addition, the V12 voltage V12 may be a voltage lower than or equal to the low potential voltage VSS. As mentioned in the description of the V2 voltage V2, by providing the V12 voltage V12 to the fifth node n5 through the second transistor T2 to adjust the voltage provided to the anode of the light-emitting element EL, flicker, which may be recognized in a low gradation, may be reduced.

In FIG. 7C, the second transistor T2 and the fifth transistor T5 of the pixel driving circuit according to one embodiment of the present disclosure shown in FIG. 2 are connected to a V25 voltage line to which a V25 voltage V25 is provided, the first transistor T1 is connected to the V1 voltage line, and the connection relationship between the remaining components is substantially the same as that in FIG. 2. In this case, the voltage provided to the fifth node n5 in the initialization period ① and the voltage provided to the third node n3 in the sampling period ② are the same as the V25 voltage V25. The V1 voltage V1 may be a negative voltage that is lower than the high potential voltage VDD, the low potential voltage VSS, and the reference voltage Vref and may be referred to as an initialization voltage. In addition, the V25 voltage V25 may be a voltage lower than or equal to the low potential voltage VSS. As mentioned in the description of the V2 voltage V2, by providing the V25 voltage V25 to the fifth node n5 through the second transistor T2 to adjust the voltage provided to the anode of the light-emitting element EL, flicker, which may be recognized in a low gradation, may be reduced.

Figure 8A:
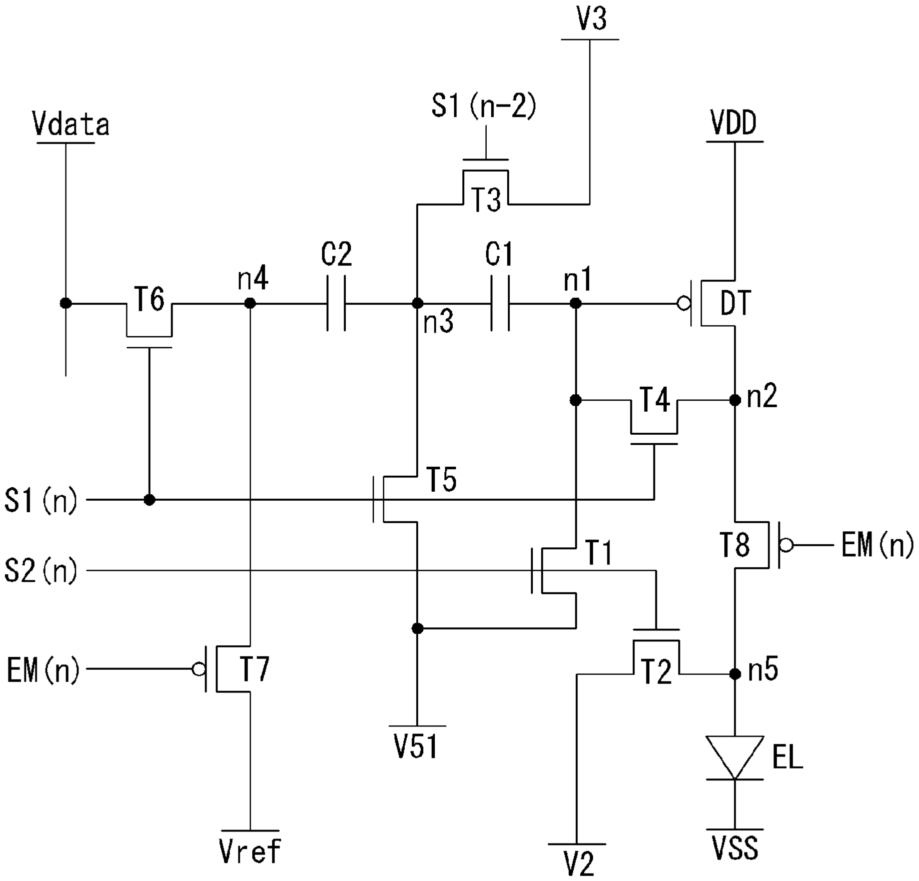
FIG. 8A illustrates a pixel driving circuit according to one embodiment of the present disclosure.

FIG. 8A illustrates a pixel driving circuit according to one embodiment of the present disclosure.

Figure 8B:
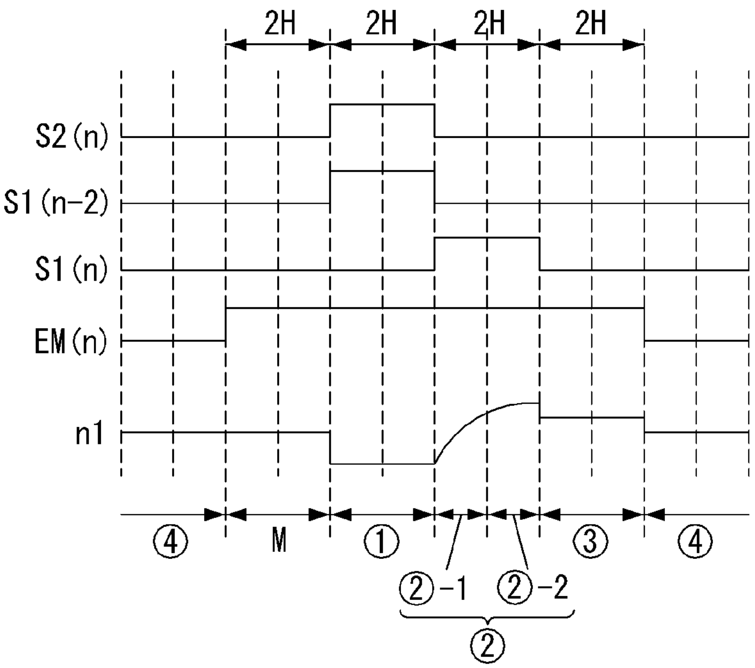
FIGS. 8B and 8C are waveform diagrams each illustrating signals input or output when the pixel driving circuit is driven using different methods.
Figure 8C:
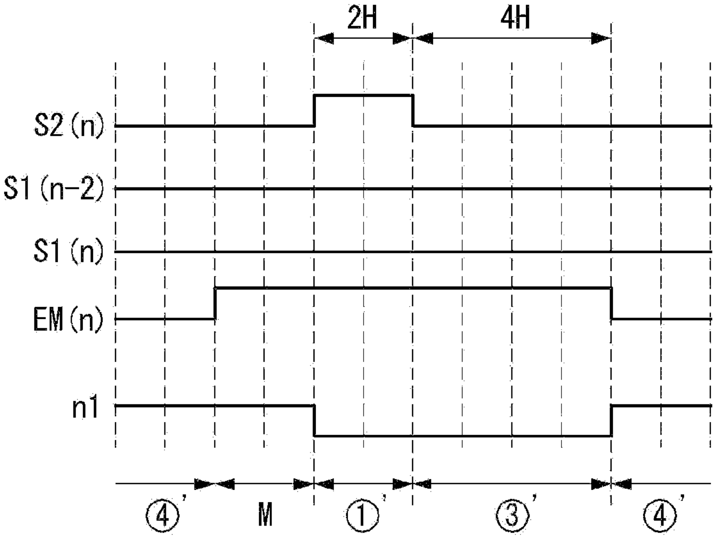

FIG. 8A illustrates a circuit modified from the pixel driving circuit according to one embodiment of the present disclosure shown in FIG. 2. FIG. 8B is a waveform diagram illustrating signals input or output when the pixel driving circuit of FIG. 8A is driven at a high speed. FIG. 8C is a waveform diagram illustrating signals input or output when the pixel driving circuit of FIG. 8A is driven at a low speed. The components in FIGS. 8A, 8B, and 8C, which have duplicated contents from the pixel driving circuits and driving processes of the pixel driving circuits shown in FIGS. 2 to 6, may be briefly described, or the descriptions thereof may be omitted.

In FIG. 8A, the connection relationship between the other components except for the first transistor T1, the second transistor T2, and the fifth transistor T5 of the pixel driving circuit according to one embodiment of the present disclosure shown in FIG. 2 is substantially the same as that in FIG. 2. In the pixel driving circuit according to one embodiment of the present disclosure, a first transistor T1 and a fifth transistor T5 are connected to a V51 voltage line to which a V51 voltage V51 is provided, and a second transistor T2 is connected to a V2 voltage line. The V51 voltage V51 may be lower than or equal to a V3 voltage V3, or may be a negative voltage that is lower than a high potential voltage VDD, a low potential voltage VSS, and a reference voltage Vref. In this case, the V51 voltage V51 may be referred to as an initialization voltage. In addition, the V2 voltage V2 may be a voltage lower than or equal to the low potential voltage VSS.

The pixel driving circuit according to one embodiment of the present disclosure includes a first switching circuit, a second switching circuit, an emission control circuit, and a third switching circuit. The first switching circuit includes a third transistor T3 controlled by an (n−2)th scant signal S1(*n*−2). The second switching circuit includes a fourth transistor T4, the fifth transistor T5, and a sixth transistor T6 controlled by a nth scant signal S1(*n*). In addition, the third switching circuit includes the first transistor T1 and the second transistor T2 controlled by an nth scan2 signal S2(*n*). In this case, the nth scant signal S1(*n*) and (n−2)th scant signal S1(*n*−2) are signals output from a first scan driving circuit, and the nth scan2 signal S2(*n*) is a signal output from a second scan driving circuit. The first scan driving circuit and the second scan driving circuit are scan driving circuits that output different scan signals.

FIG. 8B is a diagram illustrating signal waveforms at each driving process of the pixel driving circuit according to one embodiment of the present disclosure in high-speed driving (normal driving). A driving period of the pixel driving circuit may be divided into an initialization period ①, a sampling period ②, a holding period ③, and a light emission period ④. The initialization period ① has two horizontal scanning periods (2H time) and is controlled by the (n−2)th scant signal S1(*n*−2) and the nth scan2 signal S2(*n*). The (n−2)th scant signal S1(*n*−2) has an on-level pulse during the initialization period ① and an off-level pulse during periods other than the initialization period ①. While the (n−2)th scant signal S1(*n*−2) has the on-level pulse, the nth scant signal S1(*n*) and the nth emission signal EM(n) have the off-level pulse. In this case, in order to prevent the nth emission signal EM(n) and the scan signals S1(*n*−2) and S(n) from being mixed and input into the pixel driving circuit, the nth emission signal EM(n) is switched to the state of the off-level pulse with a margin period M before the initialization period ①. For example, the margin period M may have two horizontal scanning periods (2H time), but the present disclosure is not limited thereto, and the margin period M may be greater than or equal to one horizontal scan period (1H time).

During the initialization period ①, the first switching circuit (T3), the third switching circuit (T1 and T2), and a driving transistor DT are turned on, and the second switching circuit (T4, T5, and T6) and the emission control circuit (T7 and T8) are turned off.

During the initialization period ①, the first transistor T1 is turned on to provide the V51 voltage V51 to a gate of the driving transistor DT to turn the driving transistor DT on. A source of the driving transistor DT is connected to a line to which the high potential voltage VDD is applied so that the high potential voltage VDD is always maintained at the source. Accordingly, a stress voltage applied to the driving transistor DT is determined according to the V51 voltage V51 applied to the gate of the driving transistor DT. During the initialization period ①, the state of the V51 voltage V51 is maintained at a first node n1 to turn the driving transistor DT on, and constant stress is applied to the driving transistor DT. Since the stress is applied to the driving transistor DT for a predetermined period of time due to the V51 voltage V51 provided to the first node n1 through the first transistor T1, a phenomenon in which the brightness of a first frame is lowered, which occurs due to hysteresis of the driving transistor DT, may be reduced. In this case, the V51 voltage V51 is a fixed voltage that initializes the gate of the driving transistor DT while turning the driving transistor DT on. The lower the V51 voltage V51, the greater the range of a threshold voltage Vth of the driving transistor DT that can be sensed. Although it is preferable for the V51 voltage V51 to have a low voltage to turn the driving transistor DT on so that the driving transistor DT is put in a stressed state for a predetermined period of time, in order to sense the threshold voltage Vth of the driving transistor DT, the V51 voltage V51 may be set to a voltage higher than the sum of the threshold voltage Vth and the high potential voltage VDD of the driving transistor DT.

In addition, the time during which the stress is applied to the driving transistor DT may be changed by adjusting the initialization period ①. In order to improve the hysteresis of the driving transistor DT, the driving transistor DT should be maintained in a turned-on state for a predetermined period of time, and the first switching circuit according to one embodiment of the present disclosure may adjust the time for which the driving transistor DT is turned on using the (n−2)th scan1 signal S1(*n*−2) so that the influence due to the hysteresis of the driving transistor DT may be reduced. In this case, the initialization period ① is set so as not to overlap the sampling period ②.

As described above, the phenomenon in which the brightness of the first frame is lowered is noticeable during the low-speed driving. In order to implement the low-speed driving to reduce power consumption, a brightness non-uniformity phenomenon due to the brightness degradation must be solved. Accordingly, by applying constant stress to the driving transistor DT during the initialization period ① to reduce the phenomenon in which the brightness is lowered, a display panel may be implemented which may be driven at a low speed During the initialization period ①, the second transistor T2 is turned on to provide the V2 voltage V2 to an anode of the light-emitting element EL so that the anode of the light-emitting element EL is discharged to have the V2 voltage V2. Since the V2 voltage V2 is a voltage lower than or equal to the low potential voltage VSS, the light-emitting element EL does not emit light.

In addition, during the initialization period ①, the third transistor T3 is turned on to provide the V3 voltage V3 to a third node n3 so that one electrode of a first capacitor C1 is initialized to have the V3 voltage V3. The V3 voltage V3 is a fixed voltage higher than or equal to the V51 voltage V51. The voltage provided to the gate of the driving transistor DT is decreased at the time of starting sensing by making the V3 voltage V3 higher than or equal to the V51 voltage V51, thereby increasing the range in which the threshold voltage Vth of the driving transistor DT can be sensed.

The sampling period ② following the initialization period ① has two horizontal scanning periods (2H time) and is controlled by the nth scant signal S1(*n*). The nth scant signal S1(*n*) has an on-level pulse during the sampling period ② and an off-level pulse during periods other than the sampling period ②.

During the sampling period ②, the second switching circuit (T4, T5, and T6) and the driving transistor DT are turned on, and the first switching circuit (T3), the third switching circuit (T1 and T2), and the emission control circuit (T7 and T8) are turned off. In addition, the sampling period ② may include a first sampling period ②-1 and a second sampling period ②-2. The first sampling period ②-1 and the second sampling period ②-2 may each have one horizontal scan period (1H time).

During the first sampling period ②-1, a fourth transistor T4 is turned on to connect the gate and a drain of the driving transistor DT such that diode connection of the driving transistor DT is achieved, thereby turning the driving transistor DT on. The voltage of the first node n1, which is a gate node of the turned-on driving transistor DT, rises until the gate-source voltage Vgs of the driving transistor DT reaches the threshold voltage Vth of the driving transistor DT.

During the first sampling period ②-1, the fifth transistor T5 is turned on to provide the V51 voltage V51 to the third node n3. The V51 voltage V51 is a voltage lower than or equal to the V3 voltage V3 and is a fixed voltage that fixes the voltage of the third node n3 during the sampling period ②.

In addition, during the first sampling period ②-1, the sixth transistor T6 is turned on to provide a data voltage Vdata to the fourth node n4. Since the fourth node n4 is connected to one electrode of a second capacitor C2, the second capacitor C2 stores the data voltage Vdata.

During the second sampling period ②-2 following the first sampling period ②-1, the voltage of the first node n1 continues to rise to be the sum of the high potential voltage VDD and the threshold voltage Vth of the driving transistor DT, and the first capacitor C1 senses the threshold voltage Vth of the driving transistor DT. In this case, the voltage that is the sum of the high potential voltage VDD and the threshold voltage Vth is stored in one electrode of the first capacitor C1, and the V51 voltage V51 is stored in the other electrode of the first capacitor C1. The pixel driving circuit according to one embodiment of the present disclosure is implemented to include the second sampling period ②-2 so that the time for sensing the threshold voltage Vth of the driving transistor DT is sufficiently secured to enhance the reliability of the pixel driving circuit.

The third node n3 is a node shared by the first capacitor C1 and the second capacitor C2. During the sampling period ②, the voltage of the third node n3 is fixed to the V51 voltage V51 so that the sensing of the threshold voltage Vth of the driving transistor DT may be performed independently from the input of the data voltage Vdata. In this case, the first capacitor C1 and the second capacitor C2 store the threshold voltage Vth of the driving transistor DT and the data voltage Vdata, respectively.

The holding period ③ following the sampling period ② may have two horizontal scanning periods (2H time) and may be controlled by the nth emission signal EM(n). During the holding period ③, the (n−2)th scant signal S1(*n*−2), the nth scant signal S1(*n*), the nth scan2 signal S2(*n*), and the nth emission signal EM(n) have an off-level pulse, and the holding period ③ is maintained until the nth emission signal EM(n) is switched to have an on-level pulse. The emission signal EM(n) maintains the off-level pulse for at least four horizontal scanning periods overlapping the ((n−2)th scant signal S1(*n*−2), the nth scant signal S1(*n*), and the nth scan2 signal S2(*n*). Like the above-described margin period M, the holding period ③ prevents the nth emission signal EM(n) and the nth scant signal S1(*n*), which have the on-level pulse, from being mixed with each other. The holding period ③ is illustrated in FIG. 8B as having two horizontal scanning periods (2H time), but the present disclosure is not limited thereto, and the holding period ③ may be greater than or equal to one horizontal scan period (1H time).

The light emission period ④ following the holding period ③ occupies most of one frame period and is controlled by the nth emission signal EM(n). The nth emission signal EM(n) has an on-level pulse during the light emission period ④ and an off-level pulse during periods other than the light emission period ④. During the light emission period ④, all of the (n−2)th scan1 signal S1(*n*−2), the nth scan1 signal S1(*n*), and the nth scan2 signal S2(*n*) have an off-level pulse.

During the light emission period ④, the first switching circuit (T3), the second switching circuit (T4, T5, and T6), and the third switching circuit (T1 and T2) are turned off, and the emission control circuit (T7 and T8) and the driving transistor DT are turned on.

During the light emission period ④, a seventh transistor T7 is turned on to provide the reference voltage Vref to the fourth node n4. As the voltage of the fourth node n4 changes from the data voltage Vdata to the reference voltage Vref, the voltage of the third node n3 becomes the voltage obtained by subtracting the data voltage Vdata from the sum of the V51 voltage V51 and the reference voltage Vref due to the coupling phenomenon of the second capacitor C2 connected to the fourth node n4. In addition, the voltage change in the third node n3, which is caused by the coupling phenomenon of the first capacitor C1, changes the voltage of the first node n1. The voltage of the first node n1 is obtained by adding the difference between the reference voltage Vref and the data voltage Vdata to the sum of the threshold voltage Vth of the driving transistor DT and the high potential voltage VDD. The reference voltage Vref may be determined as a fixed voltage within a range of an intermediate value in the range of the data voltage Vdata. When the reference voltage Vref becomes the reference, a high gradation may be expressed with the data voltage Vdata higher than the reference voltage Vref and a low gradation may be expressed with the data voltage Vdata lower than the reference voltage Vref.

In addition, during the light emission period ④, the driving transistor DT is turned on by the voltage of the first node n1 to provide a driving current to the anode of the light-emitting element EL. In this case, a driving current $I_{oled}$ is expressed as Equation 1. As can be seen from Equation 1, the threshold voltage Vth of the driving transistor DT is removed from the equation of the driving current $I_{oled}$, and thus the driving current $I_{oled}$ is not dependent on the threshold voltage Vth of the driving transistor DT and also is not affected by the change in the threshold voltage Vth. In addition, the driving current $I_{oled}$ is also not affected by the high potential voltage VDD, and thus the variability of the driving current due to the voltage drop of the high potential voltage line is also lowered.

FIG. 8C is a diagram illustrating signal waveforms at each driving process of the pixel driving circuit according to one embodiment of the present disclosure in low-speed driving.

As described above, in the high-speed driving, the threshold voltage Vth of the driving transistor DT is sensed to display a screen in a refresh frame. In the refresh frame, a period for sensing the threshold voltage Vth of the driving transistor DT periodically occurs, and during this period, the light-emitting element EL does not emit light. For example, when driving at 60 Hz, the refresh frame is generated 60 times for one second. On the other hand, in the low-speed driving, the operation of sensing the threshold voltage Vth of the driving transistor DT is not performed, but the operation of causing the light-emitting element EL to emit light is performed. In this case, each frame may be referred to as a skip frame. When the light-emitting element EL is periodically turned off in the refresh frame and continuously emits light in the skip frame, it may be recognized as flicker, and thus an emission transistor may be used to reduce the likelihood of the light-emitting element EL from periodically emitting light even in the skip frame. For example, when driving at a low speed of 1 Hz on a 60 Hz driving display panel, the refresh frame appears in the first frame for one second, and the skip frame appears in the remaining 59 frames. However, when only the emission transistor is turned off, flicker is generated because a start voltage of the anode of the light-emitting element EL is different in the refresh frame and the skip frame. Accordingly, by providing the V2 voltage V2 to the fifth node n5 through the second transistor T2 to adjust the voltage provided to the anode of the light-emitting element EL, flicker, which may be recognized in a low gradation, may be reduced. In other words, in the skip frame, the pixel driving circuit periodically resets the anode voltage of the light-emitting element EL by providing the V2 voltage V2 to the fifth node n5. FIG. 8B illustrates waveforms of signals for driving the pixel driving circuit in the refresh frame, and FIG. 8C illustrates waveforms of signals for driving the pixel driving circuit in the skip frame. Hereinafter, a driving process of the pixel driving circuit that may be applied to the skip frame will be described.

Referring to FIG. 8C, a driving period of the pixel driving circuit may be divided into an initialization period ①', a holding period ③', and a light emission period ④'.

The initialization period ①' has two horizontal scanning periods (2H time) and is controlled by the nth scan2 signal S2(*n*). The nth scan2 signal S2(*n*) has an on-level pulse during the initialization period ①' and an off-level pulse during periods other than the initialization period ①'. While the nth scan2 signal S2(*n*) has the on-level pulse, the nth scan1 signal S1(*n*), the (n−2)th scan1 signal S1(*n*−2), and the nth emission signal EM(n) have the off-level pulse. In this case, in order to prevent the nth emission signal EM(n) and the nth scan2 signal S2(*n*) from being mixed and input into the pixel driving circuit, the nth emission signal EM(n) is switched to the state of the off-level pulse with a margin period M before the initialization period ①'. For example, the margin period M may be two horizontal scanning periods (2H time), but the present disclosure is not limited thereto, and the margin period M may be greater than or equal to one horizontal scan period (1H time).

During the initialization period ①', the third switching circuit (T1 and T2) and the driving transistor DT are turned on, and the first switching circuit (T3), the second switching circuit (T4, T5, and T6), and the emission control circuit (T7 and T8) are turned off.

During the initialization period ①', the first transistor T1 is turned on to provide the V51 voltage V51 to the gate of the driving transistor DT to turn the driving transistor DT on. The source of the driving transistor DT is connected to the line to which the high potential voltage VDD is applied so that the high potential voltage VDD is always maintained at the source. Accordingly, a stress voltage applied to the driving transistor DT is determined according to the V51 voltage V51 applied to the gate of the driving transistor DT. During the initialization period ①', the state of the V51 voltage V51 is maintained at the first node n1 to turn the driving transistor DT on, and constant stress is applied to the driving transistor DT. Since the stress is applied to the driving transistor DT for a predetermined period of time due to the V51 voltage V51 provided to the first node n1 through the first transistor T1, a phenomenon in which the brightness of a first frame is lowered, which occurs due to the hysteresis of the driving transistor DT, may be reduced. In this case, the V51 voltage V51 is a fixed voltage that is a voltage initializing the gate of the driving transistor DT while turning the driving transistor DT on. The lower the V51 voltage V51, the greater the range of the threshold voltage Vth of the driving transistor DT that can be sensed.

In addition, the time during which the stress is applied to the driving transistor DT may be changed by adjusting the initialization period ①'. In order to improve the hysteresis of the driving transistor DT, the driving transistor DT should be maintained in a turned-on state for a predetermined period of time, and the first switching circuit according to one embodiment of the present disclosure may adjust the time for which the driving transistor DT is turned on using the (n−2)th scant signal S1(*n*−2) so that the influence due to the hysteresis of the driving transistor DT may be reduced.

As described above, the phenomenon in which the brightness of the first frame is lowered is noticeable during low-speed driving. In order to implement the low-speed driving to reduce power consumption, a brightness non-uniformity phenomenon due to the brightness degradation must be solved. Accordingly, by applying constant stress to the driving transistor DT during the initialization period ①' to reduce the phenomenon in which the brightness is lowered, a display panel may be implemented which may be driven at a low speed. In order to reduce the variation of the driving current due to the hysteresis of the driving transistor DT, the driving transistor DT is turned on for a predetermined period of time in the skip frame as well as in the refresh frame.

As described above, during the initialization period ①', the second transistor T2 is turned on to provide the V2 voltage V2 to the anode of the light-emitting element EL to periodically reset the anode, thereby reducing flicker that may be recognized in a low gradation.

In the light emission period ④' prior to the initialization period ①', the first node n1 is in the state of a voltage for the driving transistor DT to provide the driving current $I_{oled}$ to the light-emitting element EL, and this voltage is defined as a set voltage. In addition, the fourth node n4 is in the state of the reference voltage Vref. As the voltage of the first node n1 changes to the V51 voltage V51 during the initialization period ①', the difference between the V51 voltage V51 and the set voltage is reflected to the fourth node n4 so that the voltage of the fourth node n4 becomes the voltage obtained by adding the difference between the V51 voltage V51 and the set voltage to the reference voltage Vref.

In the skip frame, the sampling period is omitted and the holding period ③' proceeds following the initialization period ①'. The holding period ③' may have four horizontal scanning periods (4H time) and may be controlled by the nth emission signal EM(n). During the holding period ③', the (n−2)th scan1 signal S1(*n*−2), the nth scan1 signal S1(*n*), the nth scan2 signal S2(*n*), and the nth emission signal EM(n) have an off-level pulse, and the holding period ③' is maintained until the nth emission signal EM(n) is switched to have an on-level pulse. The emission signal EM(n) maintains the off-level pulse for at least two horizontal scanning periods overlapping the nth scan2 signal S2(*n*). Like the above-described margin period M, the holding period ③' prevents the nth emission signal EM(n) and the nth scan2 signal S2(*n*), which have the on-level pulse, from being mixed with each other. The holding period ③' may be maintained for four horizontal scanning periods (4H time) so as to be the same as the light emission period in the refresh frame but is not limited thereto and may be maintained for more than one horizontal scanning period.

The light emission period ④' following the holding period ③' occupies most of one frame period and is controlled by the nth emission signal EM(n). The nth emission signal EM(n) has an on-level pulse during the light emission period ④' and an off-level pulse during periods other than the light emission period ④'. During the light emission period ④', all of the (n−2)th scan1 signal S1(*n*−2), the nth scan1 signal S1(*n*), and the nth scan2 signal S2(*n*) have an off-level pulse.

During the light emission period ④', the first switching circuit (T3), the second switching circuit (T4, T5, and T6), and the third switching circuit (T1 and T2) are turned off, and the emission control circuit (T7 and T8) and the driving transistor DT are turned on.

During the light emission period ④', the seventh transistor T7 is turned on to provide the reference voltage Vref to the fourth node n4. The voltage change in the third node n3 caused by the coupling phenomenon of the second capacitor C2 and the first capacitor C1, which occurs as the fourth node n4 changes from the data voltage Vdata to the reference voltage Vref, changes the voltage of the first node n1. The voltage of the first node n1 becomes the set voltage again. In addition, the driving current $I_{oled}$ provided by the driving transistor DT during the light emission period ④' is expressed as Equation 1.

Accordingly, the pixel driving circuit according to one embodiment of the present disclosure may reduce the leakage current at the gate node of the driving transistor DT, which may be generated during high-speed driving (normal driving), and reduce brightness degradation that may occur during low-speed driving so that an electroluminescent display device to which the pixel driving circuit according to one embodiment of the present disclosure is applied may reduce power consumption while enhancing image quality.

Figure 9A:
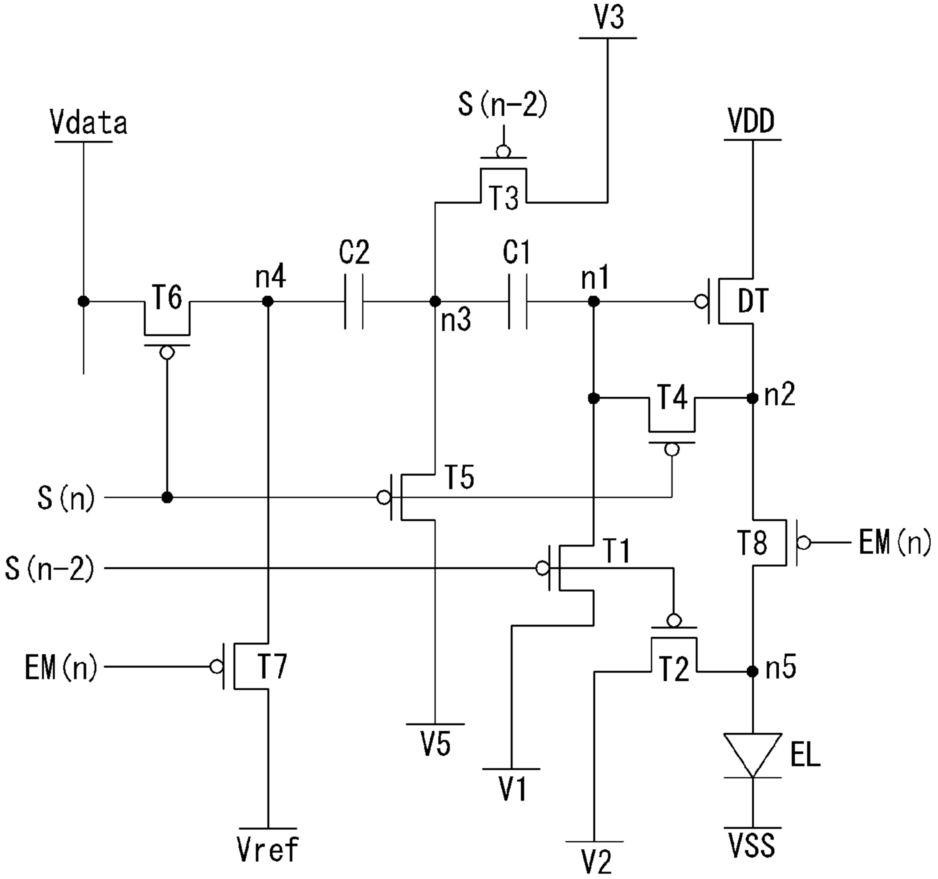
FIG. 9A illustrates a pixel driving circuit according to one embodiment of the present disclosure.
Figure 9B:
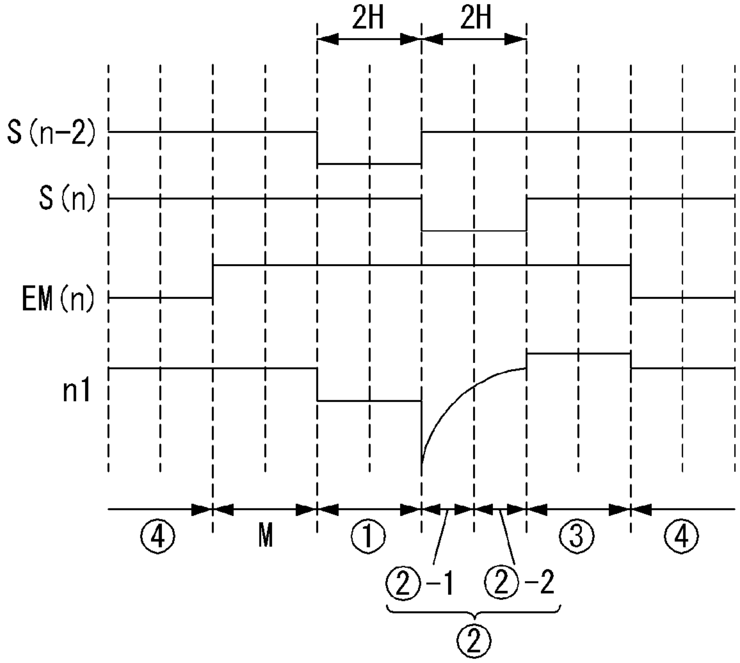
FIG. 9B is a waveform diagram illustrating signals input or output when the pixel driving circuit is driven.

FIG. 9A illustrates a circuit modified from the pixel driving circuit according to one embodiment of the present disclosure shown in FIG. 2. FIG. 9B is a waveform diagram illustrating signals input or output when the pixel driving circuit of FIG. 9A is driven at a high speed. The components in FIG. 9, which have the duplicated contents from the pixel driving circuits and driving processes of the pixel driving circuits shown in FIGS. 2 to 6, may be briefly described, or the descriptions thereof may be omitted.

The connection relationship between the components included in the pixel driving circuit according to one embodiment of the present disclosure shown in FIG. 2 is equally applied to FIG. 9A. However, in the pixel driving circuit shown in FIG. 9A, all transistors included in a first switching circuit and a second switching circuit are p-type transistors. In addition, referring to FIG. 9B, an on-level pulse of each of an (n−2)th scan signal and an nth scan signal has a gate low voltage.

The pixel driving circuit according to one embodiment of the present disclosure operates by being divided into an initialization period ①, a sampling period ②, a holding period ③, and a light emission period ④.

The initialization period ① has two horizontal scanning periods (2H time) and is controlled by an (n−2)th scan signal S(n−2). The (n−2)th scan signal S(n−2) has an on-level pulse during the initialization period ① and an off-level pulse during periods other than the initialization period ①. In this case, in order to prevent the nth emission signal EM(n) and the scan signals S1(*n*−2) and S(n) from being mixed and input into the pixel driving circuit, the nth emission signal EM(n) is switched to the state of the off-level pulse with a margin period M before the initialization period ①. For example, the margin period M may have two horizontal scanning periods (2H time), but the present disclosure is not limited thereto, and the margin period M may be greater than or equal to one horizontal scan period (1H time).

During the initialization period ①, a first switching circuit (T1, T2, and T3) and a driving transistor DT are turned on, and a second switching circuit (T4, T5, and T6) and an emission control circuit (T7 and T8) are turned off.

During the initialization period ①, a first transistor T1 is turned on to provide a V1 voltage V1 to a gate of the driving transistor DT to turn the driving transistor DT on. A source of the driving transistor DT is connected to a line to which a high potential voltage VDD is applied so that the high potential voltage VDD is always maintained at the source. Accordingly, a stress voltage applied to the driving transistor DT is determined according to the V1 voltage V1 applied to the gate of the driving transistor DT. During the initialization period ①, the state of the V1 voltage V1 is maintained at a first node n1 to turn the driving transistor DT on, and constant stress is applied to the driving transistor DT. Since the stress is applied to the driving transistor DT for a predetermined period of time due to the V1 voltage V1 provided to the first node n1 through the first transistor T1, a phenomenon in which the brightness of a first frame is lowered, which may occur due to hysteresis of the driving transistor DT, may be reduced. In this case, the V1 voltage V1 is a fixed voltage that initializes the gate of the driving transistor DT while turning the driving transistor DT on. The lower the V1 voltage V1, the greater the range of a threshold voltage Vth of the driving transistor DT that can be sensed. Although it is preferable for the V1 voltage V1 to have a low voltage to turn the driving transistor DT on so that the driving transistor DT is put in a stressed state for a predetermined period of time, in order to sense the threshold voltage Vth of the driving transistor DT, the V1 voltage V1 may be set to a voltage higher than the sum of the threshold voltage Vth and the high potential voltage VDD of the driving transistor DT.

In addition, the time during which the stress is applied to the driving transistor DT may be changed by adjusting the initialization period ①. In order to improve the hysteresis of the driving transistor DT, the driving transistor DT should be maintained in a turned-on state for a predetermined period of time, and the first switching circuit according to one embodiment of the present disclosure may adjust the time for which the driving transistor DT is turned on using the (n−2)th scan signal S(n−2) to reduce the influence due to the hysteresis of the driving transistor DT. In this case, the initialization period ① is set so as not to overlap the sampling period ②.

During the initialization period ①, a second transistor T2 is turned on to provide a V2 voltage V2 to an anode of a light-emitting element EL so that the anode of the light-emitting element EL is discharged to have the V2 voltage V2. Since the V2 voltage V2 is a voltage lower than or equal to a low potential voltage VSS, the light-emitting element EL does not emit light.

In addition, during the initialization period ①, a third transistor T3 is turned on to provide a V3 voltage V3 to a third node n3 so that one electrode of a first capacitor C1 is initialized to have the V3 voltage V3. The V3 voltage V3 is a fixed voltage higher than or equal to a V5 voltage V5. The voltage provided to the gate of the driving transistor DT is decreased at the time of starting sensing by making the V3 voltage V3 higher than or equal to the V5 voltage V5, thereby increasing the range in which the threshold voltage Vth of the driving transistor DT can be sensed.

The sampling period ② following the initialization period ① has two horizontal scanning periods (2H time) and is controlled by an nth scan signal S(n). The nth scan signal S(n) has an on-level pulse during the sampling period ② and an off-level pulse during periods other than the sampling period ②.

During the sampling period ②, the second switching circuit (T4, T5, and T6) and the driving transistor DT are turned on, and the first switching circuit (T1, T2, and T3) and the emission control circuit (T7 and T8) are turned off. In addition, the sampling period ③ may include a first sampling period ②-1 and a second sampling period ②-2. The first sampling period ②-1 and the second sampling period ②-2 may each have one horizontal scan period (1H time).

During the first sampling period ②-1, a fourth transistor T4 is turned on to connect the gate and a drain of the driving transistor DT so that diode connection of the driving transistor DT is achieved, thereby turning the driving transistor DT on. The voltage of the first node n1, which is a gate node of the turned-on driving transistor DT, rises until the gate-source voltage Vgs of the driving transistor DT reaches the threshold voltage Vth of the driving transistor DT.

During the first sampling period ②-1, the fifth transistor T5 is turned on to provide the V5 voltage V5 to the third node n3. The V5 voltage V5 is a voltage lower than or equal to the V3 voltage V3 and is a fixed voltage that fixes the voltage of the third node n3 during the sampling period ②.

In addition, during the first sampling period ②-1, a sixth transistor T6 is turned on to provide a data voltage Vdata to a fourth node n4. Since the fourth node n4 is connected to one electrode of a second capacitor C2, the second capacitor C2 stores the data voltage Vdata.

During the second sampling period ②-2 following the first sampling period ②-1, the voltage of the first node n1 continues to rise to be the sum of the high potential voltage VDD and the threshold voltage Vth of the driving transistor DT, and the first capacitor C1 senses the threshold voltage Vth of the driving transistor DT. In this case, the voltage that is the sum of the high potential voltage VDD and the threshold voltage Vth is stored in one electrode of the first capacitor C1, and the V5 voltage V5 is stored in the other electrode of the first capacitor C1. The pixel driving circuit according to one embodiment of the present disclosure is implemented to include the second sampling period ②-2 so that the time for sensing the threshold voltage Vth of the driving transistor DT is sufficiently secured to enhance the reliability of the pixel driving circuit.

The third node n3 is a node shared by the first capacitor C1 and the second capacitor C2. During the sampling period ②, the voltage of the third node n3 is fixed to the V5 voltage V5 so that the sensing of the threshold voltage Vth of the driving transistor DT may be performed independently from the input of the data voltage Vdata. In this case, the first capacitor C1 and the second capacitor C2 store the threshold voltage Vth of the driving transistor DT and the data voltage Vdata, respectively.

The holding period ③ following the sampling period ② may have two horizontal scanning periods (2H time) and may be controlled by the nth emission signal EM(n). During the holding period ③, the (n−2)th scan signal S(n−2), the nth scan signal S(n), and the nth emission signal EM(n) have an off-level pulse, and the holding period ③ is maintained until the nth emission signal EM(n) is switched to an on-level pulse. The emission signal EM(n) maintains the off-level pulse for at least four horizontal scanning periods overlapping the (n−2)th scan signal S(n−2) and the nth scan signal S(n). Like the above-described margin period M, the holding period ③ prevents the nth emission signal EM(n) and the nth scan1 signal S1(*n*), which have the on-level pulse, from being mixed with each other. The holding period ③ is illustrated in FIG. 9B as having two horizontal scanning periods (2H time), but the present disclosure is not limited thereto, and the holding period ③ may be greater than or equal to one horizontal scan period (1H time).

The light emission period ④ following the holding period ③ occupies most of one frame period and is controlled by the nth emission signal EM(n). The nth emission signal EM(n) has an on-level pulse during the light emission period ④ and an off-level pulse during periods other than the light emission period ④. During the light emission period ④, both the (n−2)th scan signal S(n−2) and the nth scan signal S(n) have an off-level pulse.

During the light emission period ④, the first switching circuit (T1, T2, and T3) and the second switching circuit (T4, T5, and T6) are turned off, and the emission control circuit (T7 and T8) and the driving transistor DT are turned on.

During the light emission period ④, a seventh transistor T7 is turned on to provide a reference voltage Vref to the fourth node n4. In addition, the driving transistor DT is turned on by the voltage of the first node n1 to provide a driving current to the anode of the light-emitting element EL. In this case, a driving current $I_{oled}$ is expressed as Equation 1. As can be seen from Equation 1, the threshold voltage Vth of the driving transistor DT is removed from the equation of the driving current $I_{oled}$, and thus the driving current $I_{oled}$ is not dependent on the threshold voltage Vth of the driving transistor DT and also is not affected by the change in the threshold voltage Vth. In addition, the driving current $I_{oled}$ is also not affected by the high potential voltage VDD, and thus the variability of the driving current due to the voltage drop of the high potential voltage line is also lowered.

An electroluminescent display device including the pixel driving circuit according to the embodiment of the present disclosure will be described as follows.

A plurality of pixels included in an nth row (here, n is a natural number) of the electroluminescent display device according to one embodiment of the present disclosure each include a light-emitting element and a pixel driving circuit. The light-emitting element includes an anode, an organic compound layer, and a light-emitting layer. The pixel driving circuit includes a driving transistor including a gate connected to a first node, a drain connected to a second node, and a source connected to a high potential voltage line providing a high potential voltage; a first capacitor connected to the first node and a third node; a second capacitor connected to a third node and a fourth node; a first switching circuit that is controlled by an (n−2)th scan signal and turned on in response to the (n−2)th scan signal to provide a V1 voltage to the first node, provide a V3 voltage to the third node, and provide a V2 voltage to the anode; a second switching circuit that is controlled by an nth scan signal and turned on in response to the nth scan signal to electrically connect the first node to the second node, provide a V5 voltage to the third node, and provide a data voltage to the fourth node; and an emission control circuit that is controlled by the nth emission signal and turned on in response to an nth emission signal to electrically connect the second node to the anode and provide a reference voltage to the fourth node. Accordingly, in the electroluminescent display device to which low-speed driving is applied, a brightness non-uniformity phenomenon that may be recognized at a low gradation may be reduced, and a period for sensing the threshold voltage of the driving transistor is sufficiently secured, thereby enhancing the accuracy of the pixel driving circuit.

According to another aspect of the present disclosure, the first switching circuit and the second switching circuit may include NMOS transistors, and the driving transistor and the emission control circuit may include PMOS transistors.

According to another aspect of the present disclosure, the V1 voltage, the V2 voltage, the V3 voltage, the V5 voltage, and the reference voltage may be fixed voltages that are different from each other, and the data voltage may be a voltage having a range. In this case, the V3 voltage may be a voltage higher than or equal to the V5 voltage. In addition, the V1 voltage may be a voltage higher than the sum of a threshold voltage of a driving transistor and a high potential voltage.

According to another aspect of the present disclosure, the pixel driving circuit may be driven with different driving processes in high-speed driving and low-speed driving. In this case, the pixel driving circuit may be driven with processes having an initialization period, a sampling period, a holding period, and a light emission period in the high-speed driving and may be driven with processes having an initialization period, a holding period, and a light emission period in the low-speed driving. In this case, the V2 voltage may be a voltage lower than a low potential voltage applied to a cathode. In addition, the (n−2)th scan signal may have an on-level pulse in the initialization period, the nth scan signal may have an on-level pulse in the sampling period, and the nth emission signal may have an on-level pulse in the light emission period. In this case, a period during which the nth emission signal has an off-level pulse may exist before the initialization period and after the sampling period.

According to another aspect of the present disclosure, the V1 voltage, the V2 voltage, and the V5 voltage may be the same voltage and may be a negative voltage that is lower than the low potential voltage applied to the cathode.

According to another aspect of the present disclosure, the first switching circuit may include a first transistor applying the V1 voltage to the first node, a second transistor applying the V2 voltage to the anode, and a third transistor applying the V3 voltage to the third node, which are turned on in response to the (n−2)th scan signal.

According to another aspect of the present disclosure, the second switching circuit may include a fourth transistor electrically connecting the first node to the second node, a fifth transistor applying the V5 voltage to the third node, and a sixth transistor applying the data voltage to the fourth node, which are turned on in response to the nth scan signal.

According to another aspect of the present disclosure, the emission control circuit may include a seventh transistor applying the reference voltage to the fourth node and an eighth transistor electrically connecting the second node to the anode, which are turned on in response to the nth emission signal.

According to another aspect of the present disclosure, the first capacitor may store the threshold voltage of the driving transistor, and the second capacitor may store the data voltage.

According to the embodiments of the present disclosure, leakage current that may be generated at a gate node of a driving transistor can be reduced by implementing transistors connected to the gate node of the driving transistor and a capacitor adjacent to the gate node of the driving transistor as NMOS transistors so that the same brightness can be maintained for one frame.

In addition, according to the embodiments of the present disclosure, by driving a pixel driving circuit such that a driving transistor is turned on to be in a stress state for a predetermined period of time, a phenomenon can be reduced in which the brightness of a first frame is lowered when a screen of a display panel is switched.

In addition, according to the embodiments of the present disclosure, a pixel driving circuit is implemented in which a compensation time for compensating for a threshold voltage of a driving transistor can be sufficiently secured so that the accuracy of a pixel driving circuit can be enhanced.

Since the content of the present disclosure described in the problems to be solved, the problem-solving means, and effects does not specify essential features of the claims, the scope of the claims is not limited to matters described in the content of the disclosure.

While the embodiments of the present disclosure have been described in detail above with reference to the accompanying drawings, the present disclosure is not necessarily limited to these embodiments, and various changes and modifications may be made without departing from the technical spirit of the present disclosure. Accordingly, the embodiments disclosed herein are to be considered descriptive and not restrictive of the technical spirit of the present disclosure, and the scope of the technical spirit of the present disclosure is not limited by these embodiments. Therefore, the above-described embodiments should be understood to be exemplary and not limiting in any aspect. The scope of the present disclosure should be construed by the appended claims, and all technical spirits within the scopes of their equivalents should be construed as being included in the scope of the present disclosure.

What is claimed is:

1. A pixel driving circuit comprising:

a driving transistor including a gate connected to a first node, a drain connected to a second node, and a source connected to a high potential voltage line through which a high potential voltage is provided;

a first capacitor connected to the first node and a third node;

a second capacitor connected to the third node and a fourth node;

a first switching circuit turned on in response to a (n−2)th scan signal to provide a V1 voltage to the first node, provide a V3 voltage to the third node, and provide a V2 voltage to an anode;

a second switching circuit turned on in response to a nth scan signal to electrically connect the first node to the second node, provide a V5 voltage to the third node, and provide a data voltage to the fourth node; and an emission control circuit turned on in response to a nth emission signal to electrically connect the second node to the anode and provide a reference voltage to the fourth node.

2. The pixel driving circuit of claim 1, wherein the first switching circuit and the second switching circuit include n-type metal-oxide-semiconductor (NMOS) transistors, and the driving transistor and the emission control circuit include p-type metal-oxide-semiconductor (PMOS) transistors.

3. The pixel driving circuit of claim 1, wherein the V1 voltage, the V2 voltage, the V3 voltage, the V5 voltage, and the reference voltage are fixed voltages that are different from each other, and the data voltage is a voltage including a range.

4. The pixel driving circuit of claim 3, wherein the V3 voltage is a voltage higher than or equal to the V5 voltage.

5. The pixel driving circuit of claim 3, wherein the V1 voltage is a voltage higher than a sum of a threshold voltage of the driving transistor and the high potential voltage.

6. The pixel driving circuit of claim 1, wherein the pixel driving circuit is driven with different driving processes in high-speed driving and low-speed driving.

7. The pixel driving circuit of claim 6, wherein the pixel driving circuit is driven with processes having an initialization period, a sampling period, a holding period, and a light emission period in the high-speed driving, and is driven with processes having an initialization period, a holding period, and a light emission period in the low-speed driving.

8. The pixel driving circuit of claim 7, wherein during the initialization period, the first switching circuit and the driving transistor are turned on, and the second switching circuit and the emission control circuit are turned off, during the sampling period, the second switching circuit and the driving transistor are turned on, and the first switching circuit and the emission control circuit are turned off, during the holding period, the (n−2)th scan signal, the nth scan signal, and the nth emission signal have an off-level pulse, and during the light emission period, the first switching circuit and the second switching circuit are turned off, and the emission control circuit and the driving transistor are turned on.

9. The pixel driving circuit of claim 7, wherein the V2 voltage is a voltage lower than a low potential voltage applied to a cathode.

10. The pixel driving circuit of claim 7, wherein the (n−2)th scan signal has an on-level pulse in the initialization period, the nth scan signal has an on-level pulse in the sampling period, and the nth emission signal has an on-level pulse in the light emission period.

11. The pixel driving circuit of claim 10, wherein a period during which the nth emission signal has an off-level pulse exists before the initialization period and after the sampling period.

12. The pixel driving circuit of claim 1, wherein the V1 voltage, the V2 voltage, and the V5 voltage are a same voltage and are each a negative voltage that is lower than a low potential voltage applied to a cathode.

13. The pixel driving circuit of claim 1, wherein the V1 voltage and the V2 voltage are a same voltage and are each a negative voltage that is lower than a low potential voltage applied to a cathode.

14. The pixel driving circuit of claim 1, wherein the V2 voltage and the V5 voltage are a same voltage and are each a negative voltage that is lower than a low potential voltage applied to a cathode.

15. The pixel driving circuit of claim 1, wherein the first switching circuit includes a first transistor applying the V1 voltage to the first node, a second transistor applying the V2 voltage to the anode, and a third transistor applying the V3 voltage to the third node, which are turned on in response to the (n−2)th scan signal.

16. The pixel driving circuit of claim 1, wherein the second switching circuit includes a fourth transistor electrically connecting the first node to the second node, a fifth transistor applying the V5 voltage to the third node, and a sixth transistor applying the data voltage to the fourth node, which are turned on in response to the nth scan signal.

17. The pixel driving circuit of claim 1, wherein the emission control circuit includes a seventh transistor applying the reference voltage to the fourth node and an eighth transistor electrically connecting the second node to the anode, which are turned on in response to the nth emission signal.

18. The pixel driving circuit of claim 1, wherein the first capacitor stores a threshold voltage of the driving transistor, and the second capacitor stores the data voltage.

19. An electroluminescent display device comprising a plurality of pixels included in a nth row thereof (here, n is a natural number), each of the pixels including:

a light-emitting element comprising an anode, an organic compound layer, and a cathode; and the pixel driving circuit according to claim 1.

20. A pixel driving circuit comprising:

a driving transistor including a gate connected to a first node, a drain connected to a second node, and a source connected to a high potential voltage line through which a high potential voltage is provided;

a first capacitor connected to the first node and a third node;

a second capacitor connected to the third node and a fourth node;

a first switching circuit including a third transistor controlled by a (n−2)th scan signal from a first scan driving circuit;

a second switching circuit including a fourth transistor, a fifth transistor, and a sixth transistor controlled by a nth scan signal from the first scan driving circuit;

a third switching circuit including a first transistor and a second transistor controlled by a nth scan signal from a second scan driving circuit; and an emission control circuit turned on in response to a nth emission signal to electrically connect the second node to an anode and provide a reference voltage to the fourth node.

* * * * *